(12) United States Patent
Baek et al.

(10) Patent No.: US 11,249,532 B2
(45) Date of Patent: Feb. 15, 2022

(54) POWER SUPPLY AND DISPLAY DEVICE INCLUDING THE SAME

(71) Applicant: Samsung Display Co., Ltd., Yongin-si (KR)

(72) Inventors: Eun Ryeol Baek, Yongin-si (KR); Yoon Young Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/155,061

(22) Filed: Jan. 21, 2021

(65) Prior Publication Data

US 2021/0389793 A1    Dec. 16, 2021

(30) Foreign Application Priority Data

Jun. 10, 2020    (KR) ........................ 10-2020-0070437

(51) Int. Cl.
| | |
|---|---|
| *G06F 1/32* | (2019.01) |
| *G06F 1/08* | (2006.01) |
| *G06F 1/10* | (2006.01) |
| *G06F 1/12* | (2006.01) |
| *G06F 1/3206* | (2019.01) |

(52) U.S. Cl.
CPC .............. *G06F 1/3206* (2013.01); *G06F 1/08* (2013.01); *G06F 1/10* (2013.01); *G06F 1/12* (2013.01)

(58) Field of Classification Search
CPC ........... G06F 1/3206; G06F 1/08; G06F 1/10; G06F 1/12; G09G 1/005; G09G 3/3696; G09G 2300/0473; G09G 2310/0213; G09G 2330/021

See application file for complete search history.

(56) References Cited

U.S. PATENT DOCUMENTS

| | | | |
|---|---|---|---|
| 8,339,052 B2 | 12/2012 | Bea et al. | |
| 9,786,245 B2 | 10/2017 | Lee et al. | |
| 9,984,619 B2 | 5/2018 | Kim et al. | |
| 10,679,540 B2 | 6/2020 | Park et al. | |

(Continued)

FOREIGN PATENT DOCUMENTS

| | | |
|---|---|---|
| KR | 10-2014-0054760 | 5/2014 |
| KR | 10-2015-0081848 | 7/2015 |

(Continued)

*Primary Examiner* — Stefan Stoynov
(74) *Attorney, Agent, or Firm* — H.C. Park & Associates, PLC

(57) ABSTRACT

A display device includes: a display panel including scan lines, a first power line, a second power line, and pixels connected to the scan lines and the first and second power lines; a gate driver to sequentially provide scan signals to the scan lines based on a clock signal; and a power supply including transistors to convert an input power voltage into a first power voltage through a switching operation of the transistors and to supply the first power voltage to the first power line through a first output terminal. In response to an amount of current flowing through the pixels being less than a first reference current amount, the power supply is configured to change one or more of an off-duty of at least one of the transistors, a channel capacitance of at least one of the transistors, a switching frequency of at least one of the transistors, and a slew rate of at least one of control signals for the transistors.

20 Claims, 17 Drawing Sheets

(56) References Cited

U.S. PATENT DOCUMENTS

| | | | | |
|---|---|---|---|---|
| 2011/0187697 | A1* | 8/2011 | Yun | G09G 3/30 345/212 |
| 2014/0118323 | A1 | 5/2014 | Park | |
| 2016/0189613 | A1* | 6/2016 | Kim | G09G 3/3291 345/212 |
| 2021/0118398 | A1* | 4/2021 | Shimizu | G09G 3/3696 |
| 2021/0201740 | A1* | 7/2021 | Kim | G09G 3/20 |

FOREIGN PATENT DOCUMENTS

| | | |
|---|---|---|
| KR | 10-1598071 | 2/2016 |
| KR | 10-2016-0080291 | 7/2016 |
| KR | 10-2019-0066104 | 6/2019 |
| KR | 10-2019-0081832 | 7/2019 |

* cited by examiner

FIG. 9

|  | FIRST MODE (NORMAL LOAD & HEAVY LOAD) | | | | SECOND MODE (LIGHT LOAD) | | | |
| --- | --- | --- | --- | --- | --- | --- | --- | --- |
|  | DRIVING METHOD | TR SIZE | SW FREQ | SLEW RATE | DRIVING METHOD | TR SIZE | SW FREQ | SLEW RATE |
| VDD | CCM | 100% | 1.5MHz | 1ns ~ 10ns | DCM | 17% | ≤ 500KHz | ≤ 1.0ns |
| VSS | PSM / DCM / CCM | 100% | | | PSM | 17% | | |
| AVDD | PSM / DCM / CCM | 100% | | | PSM | 17% | | |
| SHUTDOWN FUNCTION | ALL FUNCTION ON | | | | PARTIAL SHUTDOWN | | | |

| | FIRST MODE | | | | | SECOND MODE | | | | |
|---|---|---|---|---|---|---|---|---|---|---|
| M1 | ON | OFF | ON | OFF | ... | OFF | OFF | OFF | OFF | ... |
| M2 | OFF | ON | OFF | ON | ... | OFF | OFF | OFF | OFF | ... |
| PSM1 | ON | OFF | ON | OFF | ... | ON | OFF | ON | OFF | ... |
| PSM2 | OFF | ON | OFF | ON | ... | OFF | ON | OFF | ON | ... |

| Main Freq.(MHz) | 1/8 Freq.(MHz) | T(us) |
|---|---|---|
| | | 5.16us |
| 1.26 | 0.1575 | 6.349206 |
| 1.29 | 0.16125 | 6.20155 |
| 1.32 | 0.165 | 6.060606 |
| 1.35 | 0.16875 | 5.925926 |
| 1.38 | 0.1725 | 5.797101 |
| 1.41 | 0.17625 | 5.673759 |
| 1.44 | 0.18 | 5.555556 |
| 1.47 | 0.18375 | 5.442177 |
| 1.5 | 0.1875 | 5.333333 |
| 1.53 | 0.19125 | 5.228758 |
| 1.56 | 0.195 | 5.128205 |
| 1.59 | 0.19875 | 5.031447 |
| 1.62 | 0.2025 | 4.938272 |
| 1.65 | 0.20625 | 4.848485 |
| 1.68 | 0.21 | 4.761905 |
| 1.71 | 0.21375 | 4.678363 |

※ T_HCLK : 193KHz (5.16μs)

FIG. 15A

| Register | Description |
| --- | --- |
| SFD_Transition_Level | LOAD LEVEL AT WHICH SFD ON/OFF |
| SFD_Hys_Level | HYSTERESIS OF SFD OPERATION ACCORDING TO LOAD |
| SFD_Debounce_time | DEBOUNCE TIME OF SFD OPERATION ACCORDING TO LOAD |
| SFD_Mode | SETTING OF FUNCTION (On/Off/SFD1/SFD2) |
| SFD_Function | SETTING OF FUNCTION OPERATION |
| SFD_Block | SETTING OF OUTPUT BLOCK CONTROLLED IN SFD OPERATION |
| SFD1_Freq | SWITCHING FREQUENCY OF SFD1 |
| SFD2_Freq | SWITCHING FREQUENCY OF SFD2 |

FIG. 15B

TABLE1

| Bit | SFD_Transition_Level |
|---|---|
| 00 | 20mA |
| 01 | 30mA |
| 10 | 40mA |
| 11 | 50mA |

TABLE2

| Bit | SFD_Hys_Level |
|---|---|
| 00 | 5mA |
| 01 | 10mA |
| 10 | 15mA |
| 11 | – |

TABLE3

| Bit | SFD_Debounce_time |
|---|---|
| 00 | 100μs |
| 01 | 300μs |
| 10 | 500μs |
| 11 | 1000μs |

TABLE4

| Bit | SFD_Mode |
|---|---|
| 00 | SFD1 |
| 01 | SFD2 |
| 10 | SFD OFF |
| 11 | – |

FIG. 15C

TABLE5

| Bit | SFD_Function |
|-----|--------------|
| 000 | Frequency only |
| 001 | Slew rate only |
| 010 | TR size only |
| 011 | Driving Mode only |
| 100 | Slew rate off |
| 101 | TR size off |
| 110 | Driving Mode off |
| 111 | All on |

TABLE6

| Bit | SFD_Block |
|-----|-----------|
| 000 | VO1 only |
| 001 | VO2 only |
| 010 | VO3 only |
| 011 | VO1/VO2 only |
| 100 | VO2/VO3 only |
| 101 | All on |

TABLE7

| Bit | SFD1_Freq |
|-----|-----------|
| 00 | 1MHz |
| 01 | 500KHz |
| 10 | 300KHz |
| 11 | 250KHz |

TABLE8

| Bit | SFD2_Freq |
|-----|-----------|
| 00 | ± 50KHz |
| 01 | ± 100KHz |
| 10 | ± 150KHz |
| 11 | ± 200KHz |

POWER SUPPLY AND DISPLAY DEVICE INCLUDING THE SAME

CROSS-REFERENCE TO RELATED APPLICATION

This application claims priority from and the benefit of Korean Patent Application No. 10-2020-0070437 filed on Jun. 10, 2020, which is hereby incorporated by reference for all purposes as if fully set forth herein.

BACKGROUND

Field

Exemplary implementations of the invention relate generally to power supplies, and more specifically, to power supplies and display devices including the same.

Discussion of the Background

A display device includes a DC-DC converter configured to generate a high-potential power source and a low-potential power source, which are necessary for driving of pixels, by converting an input power voltage supplied from the outside. The DC-DC converter supplies the generated high-potential power source and the generated low-potential power source to the pixels through power lines.

A driving current flowing through a pixel is subordinate to the high-potential power source. In order to stably provide a desired driving current to the pixel, the DC-DC converter generates the high-potential power source while operating in a continuous conduction mode (hereinafter, referred to as CCM) among various driving methods. In the CCM, the DC-DC converter switches internal transistors without pause.

The above information disclosed in this Background section is only for understanding of the background of the inventive concepts, and, therefore, it may contain information that does not constitute prior art.

SUMMARY

Applicant realized that a voltage generation circuit, such as a DC-DC converter, may have current and/or power efficiency in the CCM lower than in another mode, such as a mode for partially stopping and/or holding a switching operation of transistors of the voltage generation circuit when a load of pixels is relatively less.

Power supplies and display device including the same constructed according to the principles and exemplary implementations of the invention are capable of having improved efficiency. For example, the power supply may select one of a plurality of modes based on a load of a display unit and/or current provided from the power supply to the display unit, and may adjust one or more of an off-duty of at least one of its transistors, a channel capacitance of at least one of the transistors, a switching frequency of at least one of the transistors, and a slew rate (or transition time) of at least one of control signals for the transistors depending on the selected mode. Accordingly, the power supply may have improved current and/or power efficiency, and power loss of the power supply may be minimized. For example, the power supply may have the improved current and/or power efficiency when increasing the off-duty, decreasing the channel capacitance, decreasing the switching frequency, and/or increasing the slew rate (or decreasing the transition time). In addition, the power supply may provide the control signals having relatively low frequencies by shifting a clock signal of a scan driver by an offset frequency. Accordingly, the power supply may reduce power loss caused by switching, and reduce interference between the power supply and the scan driver.

Additional features of the inventive concepts will be set forth in the description which follows, and in part will be apparent from the description, or may be learned by practice of the inventive concepts.

According to one aspect of the invention, a display device includes: a display panel including scan lines, a first power line, a second power line, and pixels connected to the scan lines and the first and second power lines; a gate driver to sequentially provide scan signals to the scan lines based on a clock signal; and a power supply including transistors to convert an input power voltage into a first power voltage through a switching operation of the transistors and to supply the first power voltage to the first power line through a first output terminal. In response to an amount of current flowing through the pixels being less than a first reference current amount, the power supply is configured to change one or more of an off-duty of at least one of the transistors, a channel capacitance of at least one of the transistors, a switching frequency of at least one of the transistors, and a slew rate of at least one of control signals for the transistors.

The power supply may include: a frequency generation circuit to generate a switching signal having a first switching frequency in a first mode, and generate the switching signal having a second switching frequency in a second mode; a first voltage generation circuit including the transistors to generate the first power voltage in response to the switching signal; a sensing circuit to sense the amount of the current by measuring current at the first output terminal; and a functional circuit to generate a mode control signal to control the frequency generation circuit to operate in the first mode or the second mode by comparing the amount of the current with the first reference current amount. The second switching frequency may be lower than the first switching frequency, and is set to avoid a frequency of the clock signal.

The power supply may further include an oscillation circuit to generate a reference clock signal having a reference frequency. The frequency generation circuit may be configured to generate the switching signal by performing frequency division on the reference clock signal in the first mode.

The power supply may be configured to receive the clock signal through a clock signal input terminal, and the frequency generation circuit may be configured to shift the clock signal by an offset frequency to generate the switching signal in the second mode.

The power supply may further include an oscillation circuit to generate a reference clock signal having a reference frequency, and the frequency generation circuit may be configured to generate the switching signal based on the reference clock signal in the first mode.

The frequency generation circuit may include: a frequency divider to generate a frequency-divided reference clock signal by performing frequency division on the reference clock signal in response to a first mode control signal generated by the functional circuit; a clock processor to generate a compensated clock signal by shifting the clock signal by the offset frequency in response to a second mode control signal generated by the functional circuit; and a selector to output, as the switching signal, one selected among the reference clock signal, the frequency-divided reference clock signal, and the compensated clock signal in response to the first mode control signal or the second mode control signal.

The clock processor may be configured to generate the compensated clock signal by delaying pulses of the clock signal.

The functional circuit may be configured to: perform a mode change from the second mode to the first mode when the amount of current becomes smaller than the first reference current amount; and perform a mode change from the first mode to the second mode when the amount of current becomes larger than a second reference current amount. The second reference current amount may be larger than the first reference current amount.

The functional circuit may be configured to perform the mode change from the first mode to the second mode after a predetermined debounce time elapses from a time at which the amount of current becomes smaller than the first reference current amount.

The power supply may further include a driving control circuit to generate a driving control signal in response to the mode control signal, and the first voltage generation circuit may include: a first switching controller to generate a first control signal and a second control signal, each of which has a frequency corresponding to the frequency of the switching signal, and change a waveform of each of the first control signal and the second control signal in response to the driving control signal; an inductor connected between a power input terminal to which the input power voltage is applied and a first node; a first transistor connected between the first node and a reference power source, the first transistor being operated in response to the first control signal; and a second transistor connected between the first node and the first output terminal, the second transistor being operated in response to the second control signal.

The slew rate of the control signals may be defined as a transition time between a turn-on level and a turn-off level of the control signals, and the first switching controller may be configured to decrease the transition time of the first control signal in the second mode to be less than the transition time of the first control signal in the first mode in response to the driving control signal.

The first voltage generation circuit may be configured to: operate in a first driving mode for alternately turning on the first and second transistors in the first mode; and operate in a second driving mode in the second mode. In the second driving mode, the first voltage generation circuit may be configured to alternately turn on the first and second transistors in a first period, and turn off the first and second transistors in a second period.

The first voltage generation circuit may further include: a first auxiliary transistor connected in parallel to the first transistor; and a second auxiliary transistor connected in parallel to the second transistor. The first voltage generation circuit may be configured to: alternately turn on the first and second transistors in the first mode; and turn off the first and second transistors and alternately turn on the first and second auxiliary transistors in the second mode.

The power supply may further include a second voltage generation circuit to generate a second power voltage in response to the switching signal, and supply the second power voltage to the second power line through a second output terminal.

The second voltage generation circuit may include: a second switching controller to generate a third control signal and a fourth control signal, each of which has a frequency corresponding to the frequency of the switching signal, and change a waveform of each of the third control signal and the fourth control signal in response to the driving control signal; a third transistor connected between a power input terminal to which the input power voltage is applied and a second node, the third transistor being operated in response to the third control signal; an inductor connected between the second node and a reference power source; and a fourth transistor connected between the second node and the second output terminal, the fourth transistor being operated in response to the fourth control signal.

The second voltage generation circuit may be configured to operate in a third driving mode in the second mode in response to the driving control signal. In the third driving mode, the second voltage generation circuit may be configured to alternately turn on the third and fourth transistors in a third period, and turn off the third and fourth transistors in a fourth period, and the fourth period may be greater than or equal to the third period.

The second voltage generation circuit may be configured to operate in one selected among the first driving mode, the second driving mode, and third driving mode in the first mode in response to the driving control signal.

The display device may further include a data driver to provide data signals to the pixels through data lines, the power supply may further include a third voltage generation circuit to generate a third power voltage in response to the switching signal, and supply the third power voltage to the data driver through a third output terminal.

According to another aspect of the invention, a power supply for outputting a power voltage through an output terminal includes: an input terminal to receive a clock signal; a sensing circuit to measure an amount of current at the output terminal; a functional circuit to generate a first mode control signal or a second mode control signal by comparing the amount of current with a reference current amount; an oscillation circuit to generate a reference clock signal having a reference frequency; a frequency generation circuit to generate a switching signal by performing frequency division on the reference clock signal in response to the first mode control signal, or generate the switching signal by shifting the clock signal by an offset frequency in response to the second mode control signal; and a voltage generation circuit including transistors to convert an input power voltage into the power voltage by switching the transistors in response to the switching signal. A switching frequency of the switching signal is set to avoid a frequency of the clock signal.

The power supply may further include a driving control circuit to generate a driving control signal in response to the first mode control signal or the second mode control signal. The voltage generation circuit may include: a switching controller to generate a first control signal and a second control signal, each of which has a frequency corresponding to the frequency of the switching signal, and change a waveform of each of the first control signal and the second control signal in response to the driving control signal; an inductor connected between a power input terminal to which an input power voltage is applied and a first node; a first transistor connected between the first node and a reference power source, the first transistor being operated in response to the first control signal; and a second transistor connected between the first node and the output terminal, the second transistor being operated in response to the second control signal, and the switching controller may be configured to change a slew rate of the first control signal in response to the driving control signal corresponding to the second mode control signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 9 is a diagram illustrating an exemplary embodiment of operations of the power supply of FIG. 3 for each mode.

FIGS. 15A, 15B, and 15C are diagrams of exemplary embodiments of register setting values for the power supply of FIG. 3.

DETAILED DESCRIPTION

Figure 1:
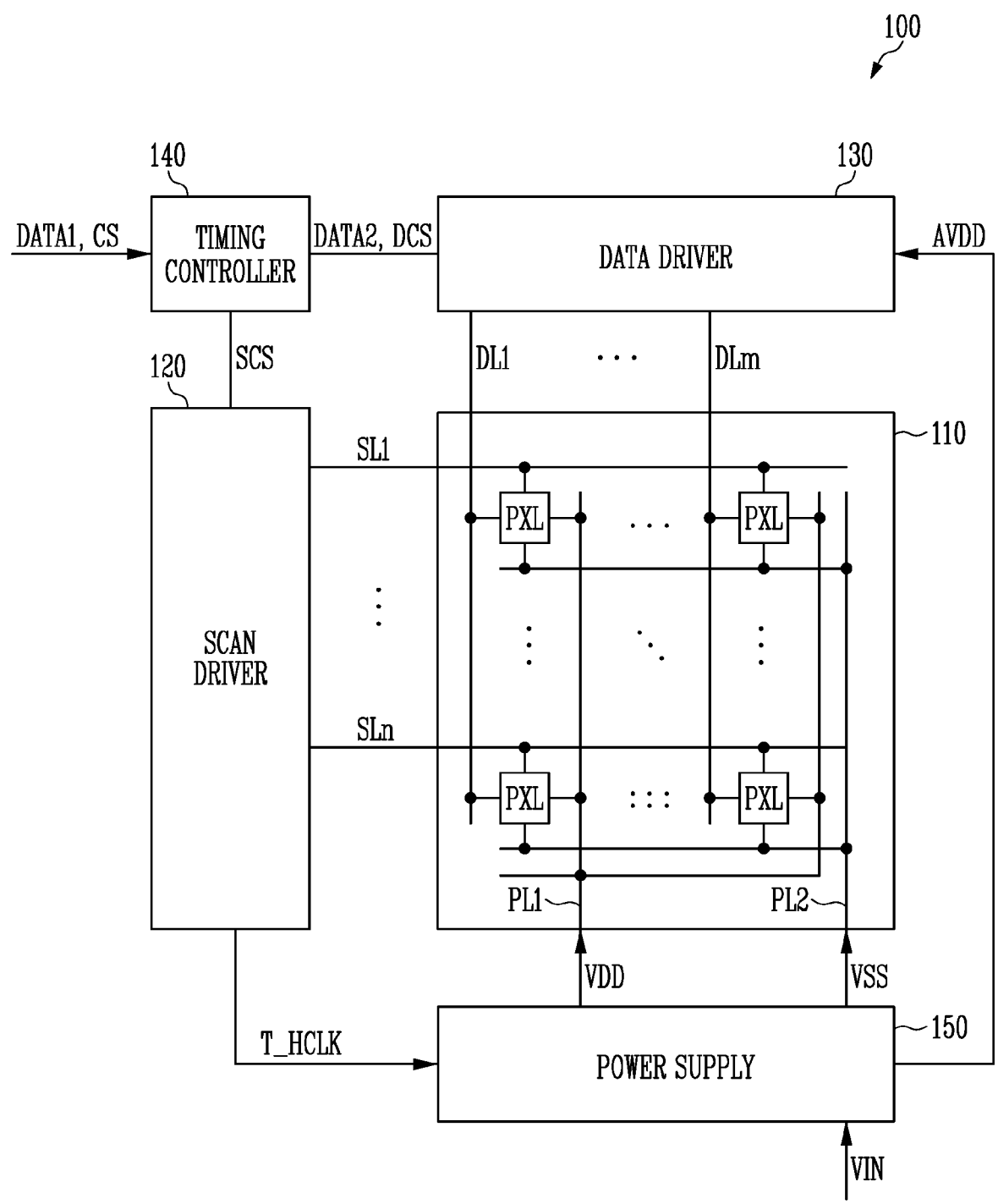
FIG. 1 is a block diagram of a display device constructed according to the principles of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a block diagram of a display device constructed according to the principles of the invention.

Referring to FIG. 1, the display device 100 may include a display unit 110 (or display panel), a scan driver 120 (or gate driver), a data driver 130, a timing controller 140, and a power supply 150 (or power supply device).

The display unit 110 may include scan lines SL1 to SLn (n is a positive integer) (or gate lines), data lines DL1 to DLm (m is a positive integer), and pixels PXL. Also, the display unit 110 may include a first power line PL1 and a second power line PL2.

The pixels PXL may be provided in areas (e.g., pixel areas) defined by the scan lines SL1 to SLn and the data lines DL1 to DLm.

Each pixel PXL may be connected to the first power line PL1, the second power line PL2, a corresponding one of the scan lines SL1 to SLn, and a corresponding one of the data lines DL1 to DLm. Hereinafter, the term "connection" includes not only electrical connection but also physical connection, and may include not only direct connection but also indirect connection through another component.

The pixel PXL may include a light emitting device and at least one transistor for providing a driving current to the light emitting device.

The pixel PXL may emit light with a luminance corresponding to a data voltage (or data signal) provided through the data line in response to a scan signal provided through the scan line. For example, a pixel PXL located on an nth row and an mth column may emit light with a luminance corresponding to a data voltage (or data signal) provided through an mth data line DLm in response to a scan signal provided through an nth scan line SLn.

The scan driver 120 may generate a scan signal, based on a scan control signal SCS, and sequentially provide the scan signal to the scan lines SL1 to SLn. The scan control signal SCS may include a scan start signal, scan clock signals, and the like, and be provided from the timing controller 140. For example, the scan driver 120 may include a shift register which sequentially generates and outputs a scan start signal in a pulse form (e.g., a pulse having a gate-on voltage level) by using scan clock signals.

The data driver 130 may generate data voltages (or data signals), based on image data DATA2 and a data control signal DCS, which are provided from the timing controller 140, and provide the data voltages to the data lines DL1 to DLm. The data control signal DCS may be a signal for controlling an operation of the data driver 130, and include a load signal (or data enable signal) for instructing output of a valid data voltage.

For example, the data driver 130 may generate a data voltage corresponding to a data value (or grayscale value) included in the image data DATA2 by using gamma voltages. The gamma voltages may be generated by the data driver 130 or be provided from a separate gamma voltage generation circuit (e.g., a gamma integrated circuit). For example, the data driver 130 may select one of the gamma voltages, based on the data value, and output the selected gamma voltage as a data signal.

The timing controller 140 may receive input image data DATA1 and a control signal CS from the outside (e.g., a graphic processor), and generate the scan control signal SCS and the data control signal DCS, based on the control signal CS. The control signal CS may include a vertical synchronization signal, a horizontal synchronization signal, a clock signal, and the like. Also, the timing controller 140 may generate the image data DATA2 by converting the input image data DATA1. For example, the timing controller 140 may convert the input image data DATA1 into the image data DATA2 having a format available in the data driver 130.

The power supply 150 may generate a first power voltage VDD to be supplied to the first power line PL1, and generate a second power voltage VSS to be supplied to the second power line PL2. The first power voltage VDD and the second power voltage VSS are voltages necessary for an operation of the pixel PXL, and the first power voltage VDD may have a voltage level higher than that of the second power voltage VSS. For example, the power supply 150 may be implemented with a power management integrated circuit (PMIC), and convert an input power voltage VIN into each of the first power voltage VDD and the second power voltage VSS through a switching operation on transistors provided therein.

Also, the power supply 150 may generate a third power voltage AVDD and provide the third power voltage AVDD to the data driver 130. The third power voltage AVDD is a voltage necessary for driving of the data driver 130 (e.g., generation of gamma voltages).

In some exemplary embodiments, the power supply 150 may change, based on a total current amount flowing through the pixels PXL, one or more of an off-duty (or on-duty) (or driving method) of at least one of the transistors in the power supply 150, a size (or channel capacitance) of at least one of the transistors, a switching frequency of at least one of the transistors, and a slew rate of a switching control signal (or control signal) such as a gate signal for at least one of the transistors. The off-duty may mean a ratio of a time in which the transistors are turned off to a switching cycle, the switching frequency may mean a number of times the transistors are turned on or turned off per unit time, and the slew rate of the switching control signal may be defined as a gradient and/or a slop at an edge (e.g., a rising edge or falling edge) of the switching control signal. The slew rate of the switching control signal may be expressed as and/or associated with a time, such as transition delay and/or time, required in a state change between turn-on and turn-off states of the transistors.

For example, the power supply 150 may measure a total current amount at at least one selected among a first output terminal through which the first power voltage VDD is output, a second output terminal through which the second power voltage VSS is output, and a third output terminal through which the third power voltage AVDD is output. For example, when the total current amount is smaller than a first reference current amount (or first reference current value), the power supply 150 may increase the off-duty of at least one of the transistors in the power supply 150, decrease the channel capacitance and/or channel capacity of at least one of the transistors, decrease the switching frequency of at least one of the transistors, and increase the slew rate of at least one of the switching control signal for the transistors (or decrease the transition time). When the slew rate is increased, the transition time may be decreased, and power loss occurring in a transition process of the transistors may be reduced. That is, when a load of the display unit 110 is relatively low, the power supply 150 may reduce a switching operation and power loss caused by the switching operation.

An operation of changing, by the power supply 150, at least one selected among the off-duty, channel capacitance, switching frequency, and slew rate of the transistors will be described later with reference to FIG. 9.

In an exemplary embodiment, the power supply 150 may receive an external clock signal T_HCLK from the scan driver 120, and generate a switching control signal for the transistors by using the external clock signal T_HCLK. The external clock signal T_HCLK may have a frequency corresponding to that of the scan signal provided to the display unit 110 from the scan driver 120. For example, the external clock signal T_HCLK may correspond to the horizontal synchronization signal, or be a scan clock signal (i.e., a clock signal used when the scan driver 120 generates the scan signal). The power supply 150 generates the switching control signal for the transistors by using the external clock signal T_HCLK, so that the switching control signal having a more optimized frequency can be generated. Accordingly, the power consumption (i.e., power consumption caused by switching) of the power supply 150 can be minimized while not being interfered with signals of the scan driver 120.

While a case where the scan driver 120, the data driver 130, and the timing controller 140 are separated from one another has been illustrated in FIG. 1, this is merely illustrative, and exemplary embodiments are not limited thereto. For example, at least one of the scan driver 120, the data driver 130, and the timing controller 140 may be formed in the display unit 110, or be implemented as an IC and then mounted on a flexible circuit board to be connected to the display unit 110. For example, the scan driver 120 may be formed in the display unit 110. In addition, at least two of the scan driver 120, the data driver 130, and the timing controller 140 may be implemented as a single IC.

Figure 2:
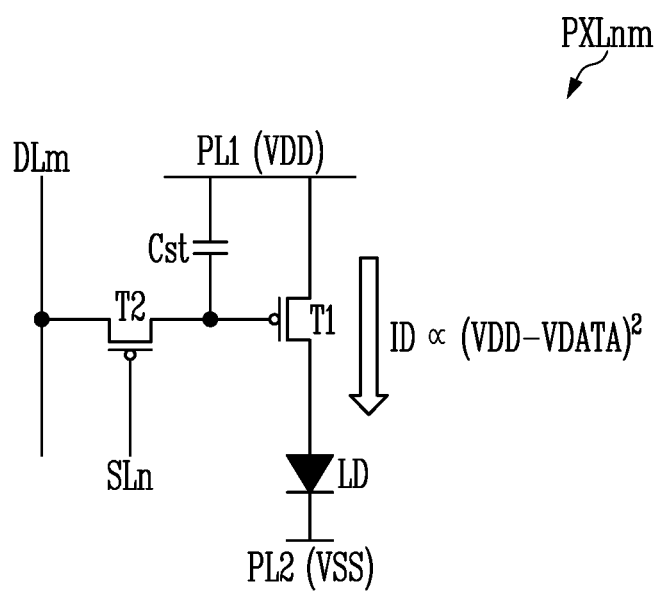
FIG. 2 is a circuit diagram of an exemplary embodiment of a representative one of the pixels of FIG. 1.

FIG. 2 is a circuit diagram of an exemplary embodiment of a representative one of the pixels of FIG. 1. The pixels PXL shown in FIG. 1 are substantially identical to one another, and therefore, an nmth pixel PXLnm included in the nth row and the mth column will be described, including the pixels PXL.

Referring to FIGS. 1 and 2, the nmth pixel PXLnm may be connected to the nth scan line SLn and the mth data line DLm. Also, the pixel PXLnm may be connected between the first power line PL1 and the second power line PL2.

The nmth pixel PXLnm may include at least one light emitting device LD, a first transistor T1 (or driving transistor), a second transistor T2 (or switching transistor), and a storage capacitor Cst. Each of the first transistor T1 and the second transistor T2 may include a silicon semiconductor, and be implemented with, for example, a P-type transistor. However, the first transistor T1 and the second transistor T2 are not limited thereto. At least one of the first transistor T1 and the second transistor T2 may include an oxide semiconductor or be implemented with an N-type transistor.

An anode electrode of the light emitting device LD may be connected to the first power line PL1 through the first transistor T1, and a cathode electrode of the light emitting device LD may be connected to the second power line PL2. The light emitting device LD may generate light with a predetermined luminance corresponding to an amount of current (or driving current ID) supplied from the first transistor T1. The light emitting device LD may be configured as an organic light emitting diode (LED) or an inorganic LED such as a micro LED or a quantum dot LED. Also, the light emitting device LD may be a light emitting device made of a combination of an organic material and an inorganic material. In FIG. 2, a case where the nmth pixel PXLnm includes a single light emitting device LD is illustrated. However, in another exemplary embodiment, the pixel PXLnm may include a plurality of light emitting devices, and the plurality of light emitting devices may be connected in parallel, series, or series/parallel to each other.

A first electrode (or a first transistor electrode) of the first transistor T1 may be connected to the first power line PL1, a second electrode (or second transistor electrode) of the first transistor T1 may be connected to the anode electrode of the light emitting device LD, and a gate electrode of the first transistor T1 may be connected to a second electrode of the second transistor T2. For example, the first electrode of the first transistor T1 may be a source electrode, and the second electrode of the first transistor T1 may be a drain electrode. However, exemplary embodiments are not limited thereto. The first transistor T1 may control an amount of driving current ID flowing through the light emitting device LD, corresponding to a voltage applied to the gate electrode thereof. For example, the driving current ID may be in proportion to a square of a difference between the first power voltage VDD and a data voltage VDATA (i.e., $ID \propto (VDD-VDATA)^2$). As such, the driving current ID flowing through each pixel may vary depending on the data voltage VDATA, which means that the driving current ID may vary depending on an image displayed by the display unit 110.

A first electrode of the second transistor T2 may be connected to the mth data line DLm, the second electrode of the second transistor T2 may be connected to the gate electrode of the first transistor T1, and a gate electrode of the second transistor T2 may be connected to the nth scan line SLn. When a scan signal having a gate-on voltage level is supplied to the nth scan line SLn, the second transistor T2 may be turned on, and the data voltage VDATA may be transferred to the gate electrode of the first transistor T1 from the mth data line DLm.

The storage capacitor Cst may be formed or connected between the first power line PL1 and the gate electrode of the first transistor T1. The storage capacitor Cst may store a voltage (i.e., the data voltage VDATA) of the gate electrode of the first transistor T1.

In FIG. 2, the nmth pixel PXLnm has been illustrated, which includes the second transistor T2 for transferring the data voltage VDATA to the inside of the nmth pixel PXLnm, the storage capacitor Cst for storing the data voltage VDATA, and the first transistor T1 for supplying the driving current ID corresponding to the data voltage VDATA to the light emitting device LD.

However, exemplary embodiments are not limited thereto, and the structure of the nmth pixel PXLnm may be variously modified and embodied. In an example, the nmth pixel PXLnm may further additionally include at least one transistor such as a transistor for compensating for a threshold voltage of the first transistor T1, a transistor for initializing the gate electrode of the first transistor T1, and/or a transistor for controlling an emission time of the light emitting device LD.

Figure 3:
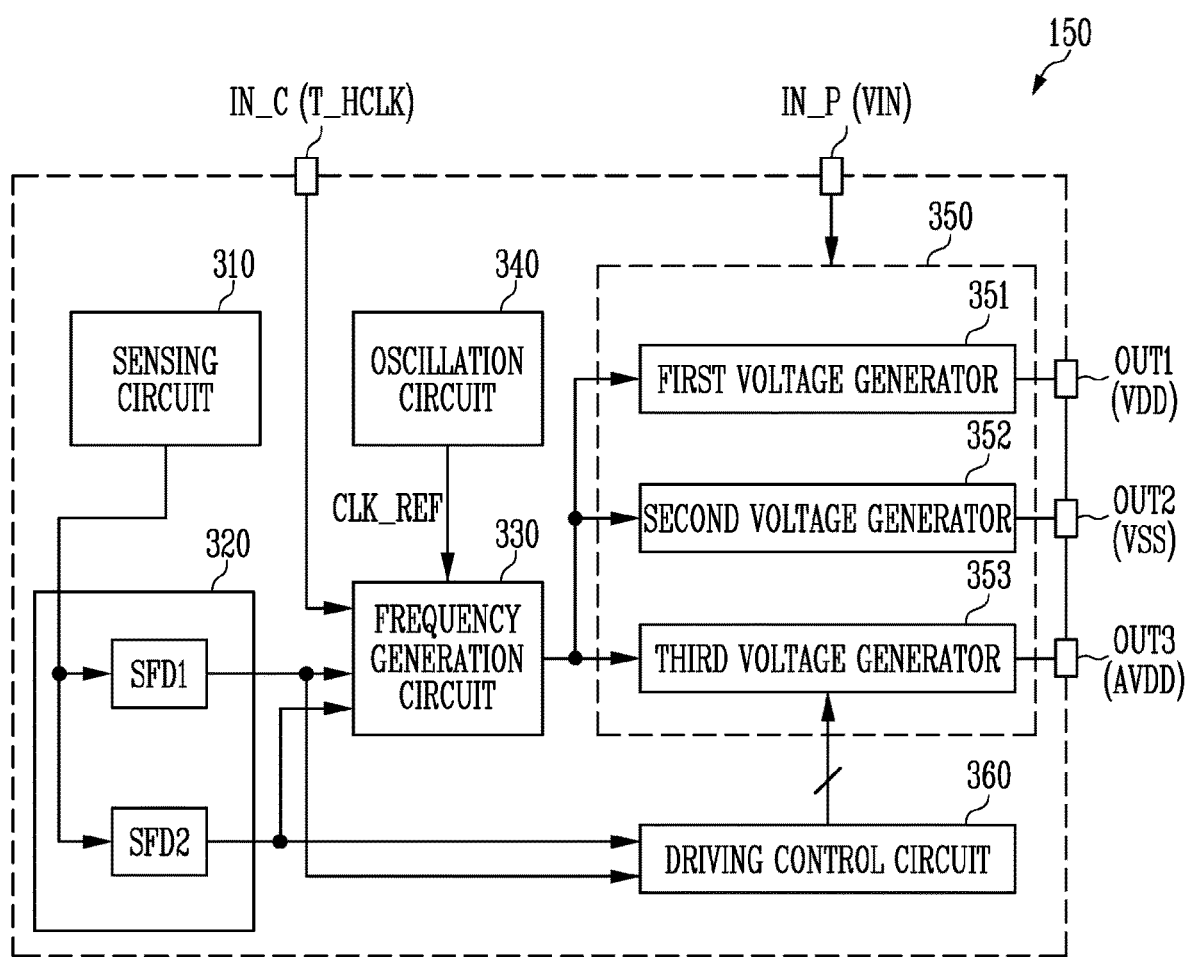
FIG. 3 is a block diagram of an exemplary embodiment of the power supply of FIG. 1.

FIG. 3 is a block diagram of an exemplary embodiment of the power supply of FIG. 1.

Referring to FIGS. 1 and 3, the power supply 150 may include a sensing circuit 310, a functional circuit 320, a frequency generation circuit 330, an oscillation circuit 340, a voltage generation circuit 350, and a driving control circuit 360. Also, the power supply 150 may further include a clock input terminal IN_C, a power input terminal IN_P, and output terminals OUT1, OUT2, and OUT3. The external clock signal T_HCLK from the scan driver 120 may be applied to the clock input terminal IN_C, the input power voltage VIN may be applied to the power input terminal IN_P, and the power voltages VDD, VSS, and AVDD may be output through the output terminals OUT1, OUT2, and OUT3.

The sensing circuit 310 may measure and/or sense a load of the display unit 110. For example, the sensing circuit 310 may measure a total current amount flowing through the pixels PXL in the display unit 110. For example, the sensing circuit 310 may sense an amount of current flowing through at least one selected among the output terminals OUT1, OUT2, and OUT3 and the power input terminal IN_P. For example, the sensing circuit 310 may sense an amount of current flowing through a first output terminal OUT1 through which the first power voltage VDD is output, or sense an amount of current flowing through a second output terminal OUT2 through which the second power voltage VSS is output.

The sensing circuit 310 may output a sensing signal corresponding to the sensed current amount. The sensing signal may have an analog form or a digital form, but the form of the sensing signal is not limited thereto.

The functional circuit 320 may determine a mode of the frequency generation circuit 330, based on the sensing signal (e.g., the total current amount). For example, the functional circuit 320 may generate a mode control signal for controlling the frequency generation circuit 330 to operate in a first mode or a second mode by comparing the total current amount with a first reference current amount (or first reference current value). For example, when the total current amount is larger than or equal to the first reference current amount (i.e., when the load of the display unit 110 is large), the functional circuit 320 may select the first mode (e.g., a normal load mode or a heavy load mode). For example, when the total current amount is smaller than the first reference current amount (i.e., when the load of the display unit 110 is small), the functional circuit 320 may select the second mode (e.g., a light load mode). While a case where the functional circuit 320 selects the first mode or the second mode has been described, exemplary embodiments are not limited thereto. For example, the functional circuit 320 may select a normal load mode, a heavy load mode, or the like according to the total current amount, even in the second mode.

In an exemplary embodiment, the functional circuit 320 may include a first functional block SFD1 and a second functional block SFD2.

The first functional block SFD1 may control the frequency generation circuit 330 to generate a switching signal by using a predetermined reference clock signal CLK_REF (or reference switching signal) in the first mode, and generate a first mode control signal therefor. The reference clock signal CLK_REF may be provided from the oscillation circuit 340. The second functional block SFD2 may control the frequency generation circuit 330 to generate the switching signal by using the external clock signal T_HCLK provided through the clock input terminal IN_C in the second mode, and generate a second mode control signal therefor.

Whether each of the first functional block SFD1 and the second functional block SFD2 is to operate may be determined according to whether the external clock signal T_HCLK is to be provided. For example, when the external clock signal T_HCLK is normally applied to the clock input terminal IN_C from the scan driver 120, the functional circuit 320 may turn on and/or activate the second functional block SFD2 and turn off and/or deactivate the first functional block SFD1. In another example, when the external clock signal T_HCLK is not applied to the clock input terminal IN_C from the scan driver 120 (or when the scan driver 120 and the clock input terminal IN_C are electrically separated from each other), the functional circuit 320 may turn on and/or activate the first functional block SFD1 and turn off and/or deactivate the second functional block SFD2. In some exemplary embodiments, the functional circuit 320 may turn off both the first functional block SFD1 and the second functional block SFD2. A setting value of the functional circuit 320 will be described later with reference to FIG. 15B.

The frequency generation circuit 330 (e.g., switching signal generation circuit or switching clock signal generation circuit) may generate the switching signal (or switching clock signal) by using one of the reference clock signal CLK_REF and the external clock signal T_HCLK in response to a mode control signal. The mode control signal may be the first mode control signal provided from the first functional block SFD1 or the second mode control signal provided from the second functional block SFD2.

In some exemplary embodiments, the frequency generation circuit 330 may generate a first switching signal having a first switching frequency in the first mode (or normal load mode), and generate a second switching signal having a second switching frequency in the second mode (or light load mode). The second switching frequency is lower than the first switching frequency, and may be set while avoiding a frequency of the external clock signal T_HCLK. For example, the pulses of the second switching signal may have transition times that do not overlap transition times of the pulses of the external clock signal T_HCLK.

In an exemplary embodiment, the frequency generation circuit 330 may generate the first switching signal having the first switching frequency by using the reference clock signal CLK_REF provided from the oscillation circuit 340 in the first mode.

For example, when the first mode control signal is provided from the first functional block SFD1, the frequency generation circuit 330 may generate a frequency-divided reference clock signal by performing frequency division on the reference clock signal CLK_REF, and generate the first switching signal having the first switching frequency by using the frequency-divided reference clock signal. For example, the frequency generation circuit 330 may perform 8-frequency division, 6-frequency division, 4-frequency division, or 3-frequency division on the reference clock signal CLK_REF.

In an exemplary embodiment, the frequency generation circuit 330 may generate the second switching signal having the second switching frequency by using the external clock signal T_HCLK in the second mode.

For example, when the second mode control signal is provided from the second functional block SFD2, the frequency generation circuit 330 may generate a compensated external clock signal (or referred as compensated clock signal) by adding a predetermined offset frequency (or offset) to the frequency of the external clock signal T_HCLK in the second mode. For example, the frequency generation circuit 330 may shift the external clock signal T_HCLK by an offset frequency to generate the compensated external clock signal. The frequency generation circuit 330 may generate the second switching signal having the second switching frequency by using the compensated external clock signal.

A frequency of the reference switching signal (e.g., reference clock signal CLK_REF, or switching control signal for transistors in the voltage generation circuit 350) is set higher than that of the external clock signal T_HCLK (or driving frequency of the scan driver 120). For example, in the first mode, the first switching frequency of the first switching signal may be about 1.5 MHz, and the frequency of the driving frequency (e.g., scan frequency, or frequency of the external clock signal T_HCLK) of the scan driver 120 may be 193 KHz. When the frequency generation circuit 330 performs frequency division on the reference clock signal CLK_REF, the first switching frequency of the first switching signal may be decreased, and the power loss of the voltage generating circuit 350 due to switching may be reduced. However, the driving frequency of the scan driver 120 is differently set depending on products. Therefore, an interference between the scan driver 120 and the power supply 150 may occur as a frequency of the frequency-divided reference clock signal becomes similar or equal to the driving frequency of the scan driver 120. When the frequency generation circuit 330 generates a compensated external clock signal by adding an offset frequency (e.g., ±50 KHz) to the frequency of the external clock signal T_HCLK in the second mode, the compensated external clock signal is set different from the driving frequency of the scan driver 120, and may have a lowest frequency. That is, when a compensated external clock signal is generated by using the external clock signal T_HCLK, the power consumption of the power supply 150 can be minimized without any interference between the scan driver 120 and the power supply 150, regardless of the products.

A detailed configuration and operation of the frequency generation circuit 330 will be described later with reference to FIGS. 13 and 14.

The oscillation circuit 340 may generate a reference clock signal CLK_REF (or reference switching signal). The oscillation circuit 340 may be implemented as a general oscillation circuit or a clock generation circuit. In some exemplary embodiments, the oscillation circuit 340 may change the frequency of the reference clock signal CLK_REF. For example, the oscillation circuit 340 may decrease the frequency of the reference clock signal CLK_REF as the load of the display unit 110 is decreased.

The voltage generation circuit 350 may include transistors, and convert the input power voltage VIN into each of the first power voltage VDD, the second power voltage VSS, and the third power voltage AVDD by switching the transistors, based on the switching signal provided from the frequency generation circuit 330.

In some exemplary embodiments, the voltage generation circuit 350 may include a first voltage generator 351, a second voltage generator 352, and a third voltage generator 353. Each of the first voltage generator 351, the second voltage generator 352, and the third voltage generator 353 may be implemented as a DC-DC converter.

The first voltage generator 351 may convert the input power voltage VIN into the first power voltage VDD. For example, the first voltage generator 351 may be implemented as a boost converter, and generate the first power voltage VDD by increasing the voltage level of the input power voltage VIN. The first voltage generator 351 may generate a switching control signal by using the switching signal, and switch internal transistors by using the switching control signal. When the frequency of the switching signal is changed (e.g., decreased), the frequency of the switching control signal may be changed (e.g., decreased), and the number of times the internal transistors are switched may be changed (e.g., decreased). A detailed configuration of the first voltage generator 351 will be described with reference to FIG. 4.

The second voltage generator 352 may convert the input power voltage VIN into the second power voltage VSS. For example, the second voltage generator 352 may be implemented as an inverting buck converter, and generate the second power voltage VSS by decreasing the voltage level of the input power voltage VIN. A detailed configuration of the second voltage generator 352 will be described with reference to FIG. 5.

The third voltage generator 353 may convert the input power voltage VIN into the third power voltage AVDD. For example, like the first voltage generator 351, the third voltage generator 353 may be implemented as a boost converter, and generate the third power voltage AVDD by increasing the voltage of the input power voltage VIN.

The driving control circuit 360 may generate a driving control signal in response to the mode control signal. The driving control signal may be used to change at least one of an off-duty (or driving method) of internal transistors of the voltage generation circuit 350, a channel capacitance of the internal transistors, and a slew rate of a switch control signal for the internal transistors. A configuration of changing the off-duty of the transistors will be described later with reference to FIGS. 6, 7, and 8, a configuration of changing the channel capacitance of the transistors will be described later with reference to FIG. 10, a configuration of changing the slew rate of the switching control signal will be described later with reference to FIG. 11.

For example, when the second mode control signal is provided from the second functional block SFD2 (or when the first mode control signal is provided from the first functional block SFD1), the driving control circuit 360 may generate a driving control signal for increasing the off-duty of the internal transistors of the voltage generation circuit 350 (or changing the mode to a driving mode in which the off-duty is relatively large), decreasing the channel capacitance of the internal transistors, or increasing the slew rate of the switching control signal for the internal transistors (or decreasing the transition time). In another example, when any mode control signal is not provided from the functional circuit 320, the driving control circuit 360 may generate a driving control signal for decreasing the off-duty of the internal transistors of the voltage generation circuit 350, increasing the channel capacitance of the internal transistors, or decreasing the slew rate of the switching control signal for the internal transistors.

A setting value of the driving control signal (and the mode control signal) for changing at least one of the off-duty of the internal transistors of the voltage generation circuit 350, the channel capacitance of the internal transistors, and the slew rate of the switching control signal for the internal transistors will be described later with reference to FIG. 15C.

As described with reference to FIG. 3, the power supply 150 may determine a mode of the power supply 150, based on the load of the display unit 110 (e.g., the total current amount of the pixels PXL), and change at least one of the switching frequency of the transistors in the power supply 150, the off-duty (or driving mode) of the transistors, the channel capacitance of the transistors, and the slew rate of the switching control signal (or gate signal) for the transistors in the determined mode (e.g., the second mode).

Also, the power supply 150 generates a switching signal (or a switching control signal for the transistors) by using the external clock signal T_HCLK, so that power loss of the power supply 150 can be minimized while not being interfered with driving of the scan driver 120.

Figure 4:
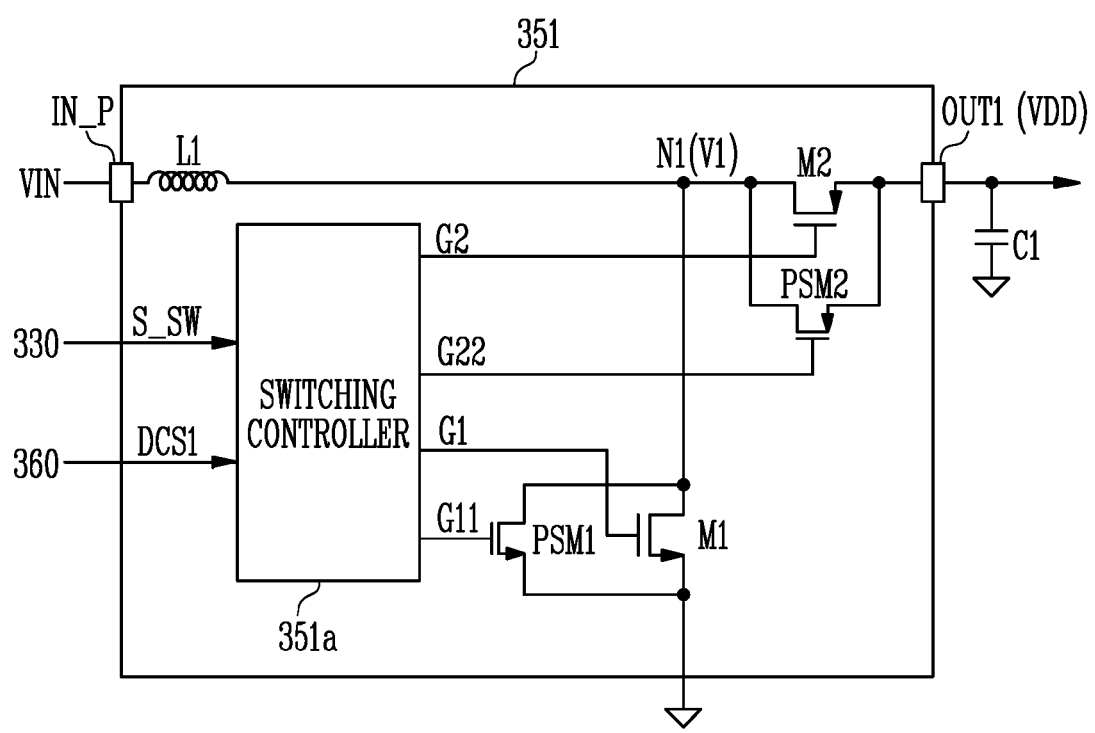
FIG. 4 is a circuit diagram of an exemplary embodiment of the first voltage generator of FIG. 3.

FIG. 4 is a circuit diagram of an exemplary embodiment of the first voltage generator of FIG. 3.

Referring to FIGS. 3 and 4, the first voltage generator 351 may include a switch unit and a first switching controller 351a. The switch unit may include a first inductor L1, a first transistor M1, and a second transistor M2. Also, the switch unit may further include a first power saving transistor PSM1 and a second power saving transistor PSM2.

Each of the first transistor M1, the second transistor M2, the first power saving transistor PSM1, and the second power saving transistor PSM2 may include an oxide semiconductor, and be implemented with an N-type transistor. However, exemplary embodiments are not limited thereto. Each of the first transistor M1, the second transistor M2, the first power saving transistor PSM1, and the second power saving transistor PSM2 may include a silicon semiconductor, and be implemented with a P-type transistor.

The first voltage generator 351 may output the first power voltage VDD by converting the input power voltage VIN, based on a switching signal S_SW (or switching clock signal). The input power voltage VIN may be provided through the power input terminal IN_P, and the first power voltage VDD may be output through the first output terminal OUT1.

The first inductor L1 may be connected between the power input terminal IN_P and a first node N1. The first power voltage VDD may be controlled based on a first inductor current flowing through the first inductor L1.

The first transistor M1 may be connected between the first node N1 and a ground (or a reference voltage line to which a reference voltage is applied). The first transistor M1 may be turned on by being applied with a first control signal G1 from the first switching controller 351a, and control a current to flow through the first inductor L1.

The first power saving transistor PSM1 may be connected in parallel to the first transistor M1. The first power saving transistor PSM1 may be turned on by being applied with a first power saving control signal G11 from the first switching controller 351a, and control a current to flow through the first inductor L1. The first power saving transistor PSM1 may substantially perform the same operation as the first transistor M1.

The first power saving transistor PSM1 may have a size (e.g., a channel capacitance) equal to or different from that of the first transistor M1. For example, the first power saving transistor PSM1 may have a size smaller than that of the first transistor M1. An allowable current amount of the first power saving transistor PSM1 may be smaller than that of the first transistor M1. For example, a channel width and/or a channel length of the first power saving transistor PSM1 may be smaller than that of the first transistor M1.

The second transistor M2 may be connected between the first node N1 and the first output terminal OUT1. The second transistor M2 may be turned on by being applied with a second control signal G2 from the first switching controller 351a. The second transistor M2 may be turned on alternately with the first transistor M1. After an electromotive force is generated in the first inductor L1 when the first transistor M1 is turned on, the second transistor M2 is turned on, so that a first node voltage V1 is converted into the first power voltage VDD.

The second power saving transistor PSM2 may be connected in parallel to the second transistor M2. The second power saving transistor PSM2 may be turned on by being applied with a second power saving control signal G22 from the first switching controller 351a. The second power saving transistor PSM2 may be turned on alternately with the first power saving transistor PSM1. The second power saving transistor PSM2 may substantially perform the same operation as the second transistor M2.

The second power saving transistor PSM2 may have a size (e.g., a channel capacitance) equal to or different from that of the second transistor M2. For example, the second power saving transistor PSM2 may have a size smaller than that of the second transistor M2.

The first switching controller 351a may control on/off of the first transistor M1, the second transistor M2, the first power saving transistor PSM1, and the second power saving transistor PSM2. The first and second transistors M1 and M2 may be alternately turned on/off under the control of the first switching controller 351a. The first and second power saving transistors PSM1 and PSM2 may be alternately turned on/off under the control of the first switching controller 351a.

In an exemplary embodiment, the first switching controller 351a may change a switching frequency (or driving frequency) in response to the switching signal S_SW. For example, the first switching controller 351a may change a switching frequency of the first and second transistors M1 and M2 (i.e., a frequency of the first and second control signals G1 and G2) and a switching frequency of the first and second power saving transistors PSM1 and PSM2 (i.e., a frequency of the first and second power saving control signals G11 and G22). For example, a switching frequency in the first mode may be about 1.5 MHz, and a switching frequency in the second mode may be about 500 KHz.

In an exemplary embodiment, the switching frequency in the second mode may be decreased to a predetermined setting value as the load of the display unit 110 (see FIG. 1) is decreased. Thus, the number of switching times of the first and second power saving transistors PSM1 and PSM2 decreased as the load of the display unit 110 is decreased, and power loss caused by transistor switching can be minimized.

In some exemplary embodiments, the first switching controller 351a may control a total size (or channel capacitance) of the first transistor M1 and the first power saving transistor PSM1, which are connected in parallel, and a total size (or channel capacitance) of the second transistor M2 and the second power saving transistor PSM2, which are connected in parallel, based on a first driving control signal DCS1. The first driving control signal DCS1 may be included in the driving control signal described with reference to FIG. 3, and be provided to the first switching controller 351a from the driving control circuit 360.

In an exemplary embodiment, the first and second transistors M1 and M2 may operate (i.e., perform a switching operation) in only the first mode (or normal load mode), and the first and second power saving transistors PSM1 and PSM2 may operate in only the second mode (or light load mode). For example, in the second mode, the first and second transistors M1 and M2 may maintain the turn-off state in response to the first and second control signals G1 and G2. Also, in the first mode, the first and second power saving transistors PSM1 and PSM2 may maintain the turn-off state in response to the first and second power saving control signals G11 and G22.

In another exemplary embodiment, the first and second power saving transistors PSM1 and PSM2 may operate in both the first mode and the second mode. For example, in the first mode, the first and second power saving transistors PSM1 and PSM2 may perform a switching operation in response to the first and second power saving control signals G11 and G22 and the first and second transistors M1 and M2 may perform the switching operation in response to the first and second control signals G1 and G2. In the second mode, the first and second power saving transistors PSM1 and PSM2 may perform the switching operation in response to the first and second power saving control signals G11 and G22 while the first and second transistors M1 and M2 may be turned off in response to the first and second control signals G1 and G2.

When a transistor is switched, power loss may occur due to a parasitic capacitance between electrodes of the transistor. The parasitic capacitance may be increased as the size of the transistor is increased, and power loss amount may also be increased according to the increase in parasitic capacitance. Thus, in the second mode, only the first and second power saving transistors PSM1 and PSM2 having a small size are switched, so that power loss can be decreased.

In an exemplary embodiment, the first switching controller 351a may control an off-duty of the transistors M1, M2, PSM1, and PSM2, based on the first driving control signal DCS1. For example, the first switching controller 351a may control the switch unit to operate in a continuous conduction mode (hereinafter, referred to as CCM) (or a first driving method) in the first mode, and control the switch unit to operate in a discontinuous conduction mode (hereinafter, referred to as DCM) (or a second driving method) in the second mode. A DCM driving method and a CCM driving method will be described later with reference to FIGS. 6 and 7.

An off-duty of the transistors M1, M2, PSM1, and PSM2 in the switch unit which operates by using the DCM driving method may be larger than that of the transistors M1, M2, PSM1, and PSM2 in the switch unit which operates by using the CCM driving method. As the off-duty of the transistors M1, M2, PSM1, and PSM2 becomes larger, a total switching time is decreased, and power loss caused by switching may be decreased.

In an exemplary embodiment, the first switching controller 351a may change a slew rate (or transition time) of the control signals G1 and G2 and the power saving control signals G11 and G22 in response to the first driving control signal DCS1. For example, a slew rate of the power saving control signals G11 and G22 in the second mode may be larger than that of the control signals G1 and G2 in the first mode. In other words, a slope of a rising/falling edge of the power saving control signals G11 and G22 in the second mode may be larger than that of a rising/falling edge of the control signals G1 and G2 in the first mode. The transition time is decreased as the slew rate is increased, and power loss occurring in a transition process can be reduced.

The third voltage generator 353 included in the power supply 150 shown in FIG. 3 may be configured substantially identical or similar to the first voltage generator 351 shown in FIG. 4.

Figure 5:
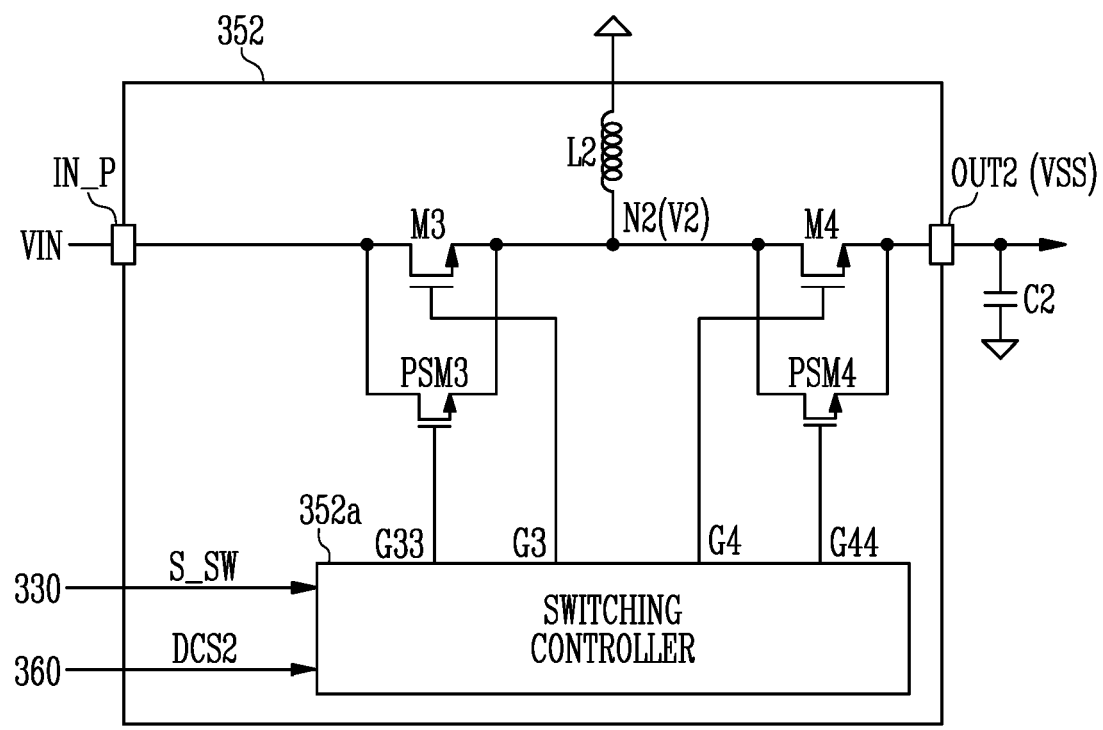
FIG. 5 is a circuit diagram of an exemplary embodiment of the second voltage generator of FIG. 3.

FIG. 5 is a circuit diagram of an exemplary embodiment of the second voltage generator of FIG. 3.

Referring to FIGS. 3 and 5, the second voltage generator 352 may include a switch unit and a second switching controller 352a. The switch unit may include a second inductor L2, a third transistor M3, and a fourth transistor M4. Also, the second voltage generator 352 may further include a third power saving transistor PSM3 and a fourth power saving transistor PSM4.

Each of the third transistor M3, the fourth transistor M4, the third power saving transistor PSM3, and the fourth power saving transistor PSM4 may include an oxide semiconductor, and be implemented with an N-type transistor.

The second voltage generator 352 may output the second power voltage VSS by converting the input power voltage VIN, based on the switching signal S_SW (or switching clock signal). The input power voltage VIN may be provided through the power input terminal IN_P, and the second power voltage VSS may be output through the second output terminal OUT2.

The second inductor L2 may be connected between a second node N2 and the ground. The second power voltage VSS may be controlled based on a second inductor current flowing through the second inductor L2.

The third transistor M3 may be connected between the power input terminal IN_P and the second node N2. The third transistor M3 may be turned on by being applied with a third control signal G3 from the second switching controller 352a, and control a current to flow through the second inductor L2.

The third power saving transistor PSM3 may be connected in parallel to the third transistor M3. The third power saving transistor PSM3 may be turned on by being applied with a third power saving control signal G33 from the second switching controller 352a, and control a current to flow through the second inductor L2. The third power saving transistor PSM3 may substantially perform the same operation as the first transistor M1.

The third power saving transistor PSM3 may have a size (e.g., a channel capacitance) equal to or different from that of the third transistor M3. For example, the third power saving transistor PSM3 may have a size smaller than that of the third transistor M3.

The fourth transistor M4 may be connected between the second node N2 and the second output terminal OUT2. The fourth transistor M4 may be turned on alternately with the third transistor M3 in response to a fourth control signal G4 supplied from the second switching controller 352a. After an electromotive force is generated in the second inductor L2 when the third transistor M3 is turned on, the fourth transistor M4 is turned on. Thus, the input power voltage VIN is converted into the second power voltage VSS, and the second power voltage VSS is output through the second output terminal OUT2.

The fourth power saving transistor PSM4 may be connected in parallel to the fourth transistor M4. The fourth power saving transistor PSM4 may be turned on by being applied with a fourth power saving control signal G44 from the second switching controller 352a. The fourth power saving transistor PSM4 may be turned on alternately with the third power saving transistor PSM3. The fourth power saving transistor PSM4 may substantially perform the same operation as the fourth transistor M4.

The fourth power saving transistor PSM4 may have a size (e.g., a channel capacitance) equal to or different from that of the fourth transistor M4. For example, the fourth power saving transistor PSM4 may have a size smaller than that of the fourth transistor M4.

The second switching controller 352a may control on/off of the third transistor M3, the fourth transistor M4, the third power saving transistor PSM3, and the fourth power saving transistor PSM4. The third and fourth transistors M3 and M4 may be alternately turned on/off under the control of the second switching controller 352a. The third and fourth power saving transistors PSM3 and PSM4 may be alternately turned on/off under the control of the second switching controller 352a.

In an exemplary embodiment, the second switching controller 352a may change a switching frequency (or driving frequency) in response to the switching signal S_SW. For example, the second switching controller 352a may change a switching frequency of the third and fourth transistors M3 and M4 (i.e., a frequency of the third and fourth control signals G3 and G4) and a switching frequency of the third and fourth power saving transistors PSM3 and PSM4 (i.e., a frequency of the third and fourth power saving control signals G33 and G44). For example, a switching frequency in the first mode may be about 1.5 MHz, and a switching frequency in the second mode may be about 500 KHz.

In some exemplary embodiments, the second switching controller 352a may control a total size (or channel capacitance) of the third transistor M3 and the third power saving transistor PSM3, which are connected in parallel, and a total size (or channel capacitance) of the fourth transistor M4 and the fourth power saving transistor PSM4, which are connected in parallel, based on a second driving control signal DCS2. The second driving control signal DCS2 may be included in the driving control signal described with reference to FIG. 3, and be provided to the second switching controller 352a from the driving control circuit 360.

In an exemplary embodiment, the third and fourth transistors M3 and M4 may operate (i.e., perform a switching operation) in only the first mode (or normal load mode), and the third and fourth power saving transistors PSM3 and PSM4 may operate in only the second mode (or light load mode). For example, in the second mode, the third and fourth transistors M3 and M4 may maintain the turn-off state in response to the third and fourth control signals G3 and G4. Also, in the first mode, the third and fourth power saving transistors PSM3 and PSM4 may maintain the turn-off state in response to the third and fourth power saving control signals G33 and G44.

In another exemplary embodiment, the third and fourth power saving transistors PSM3 and PSM4 may operate in both the first mode and the second mode. For example, in the first mode, the third and fourth power saving transistors PSM3 and PSM4 may perform a switching operation in response to the third and fourth control signals G33 and G44 and the third and fourth transistors M3 and M4 may perform the switching operation in response to the third and fourth control signals G3 and G4. In the second mode, the third and fourth power saving transistors PSM3 and PSM4 may perform the switching operation in response to the third and fourth power saving control signals G33 and G44 while the third and fourth transistors M3 and M4 may be turned off in response to the third and fourth control signals G3 and G4.

In an exemplary embodiment, the second switching controller 352a may control an off-duty of the transistors M3, M4, PSM3, and PSM4, based on the second driving control signal DCS2. For example, the second switching controller 352a may control the switch unit to operate in one selected from the CCM, the DCM, and a pulse skip mode (hereinafter, referred to as PSM) in the first mode, and control the switch unit to operate by using a PSM driving method in the second mode. The PSM driving method will be described later with reference to FIG. 8.

That is, a driving method of the second voltage generator 352 in the first mode may be selectively used according to the load of the display unit 110 (see FIG. 1). In the case of high-luminance driving in which the load of the display unit 110 is large, the second voltage generator 352 may output the second power voltage VSS by using the CCM driving method. In the case where middle-luminance driving in which the load of the display unit 110 is smaller than a predetermined second reference load, the second voltage generator 352 may output the second power voltage VSS by using the PSM driving method.

An off-duty of the transistors M3, M4, PSM3, and PSM4 in the switch unit which operates by using the PSM driving method may be larger than that of the transistors M3, M4, PSM3, and PSM4 in the switch unit which operates by using the DCM driving method. As the off-duty of the transistors M3, M4, PSM3, and PSM4 becomes larger, a total switching time is decreased, and power loss caused by switching may be decreased.

In an exemplary embodiment, the second switching controller 352a may change a slew rate of the control signals G3 and G4 and the power saving control signals G33 and G44 in response to the second driving control signal DCS2. For example, a transition time of the power saving control signals G33 and G44 in the second mode may be smaller than that of the control signals G3 and G4 in the first mode. The transition time is further decreased as the slew rate is increased, and power loss occurring in a transition process can be reduced.

Figure 6:
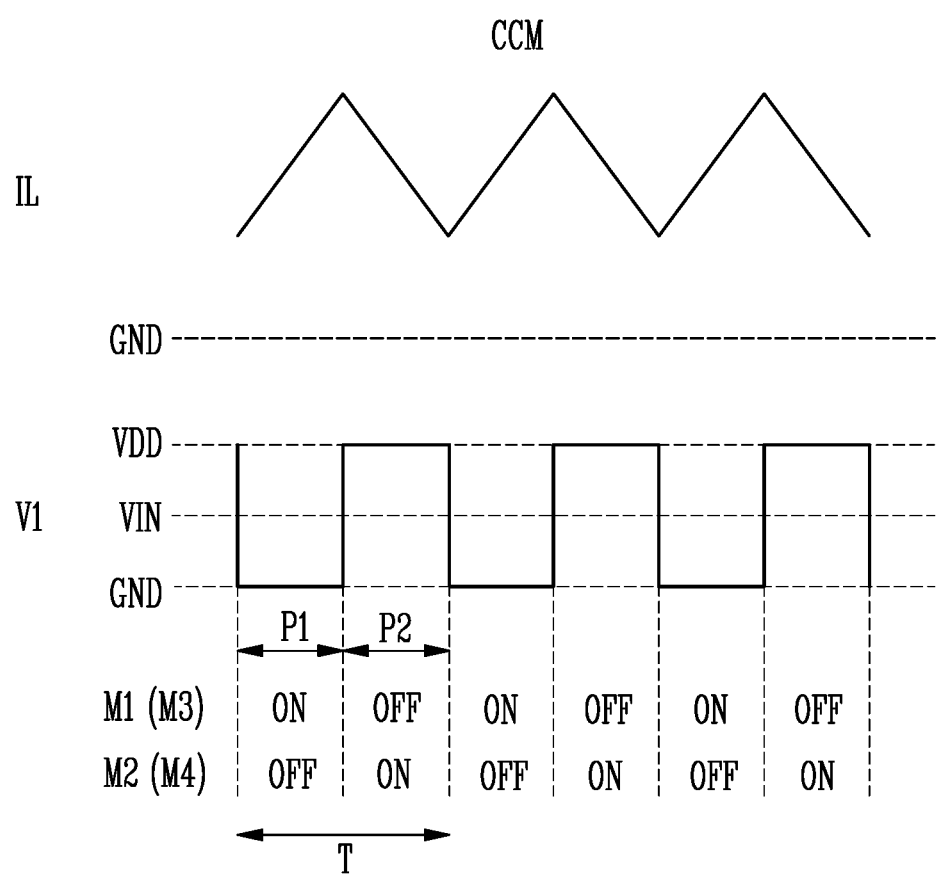
FIG. 6 is a timing diagram of an exemplary embodiment of signals of the first voltage generator of FIG. 4 performing a CCM driving method.
Figure 7:
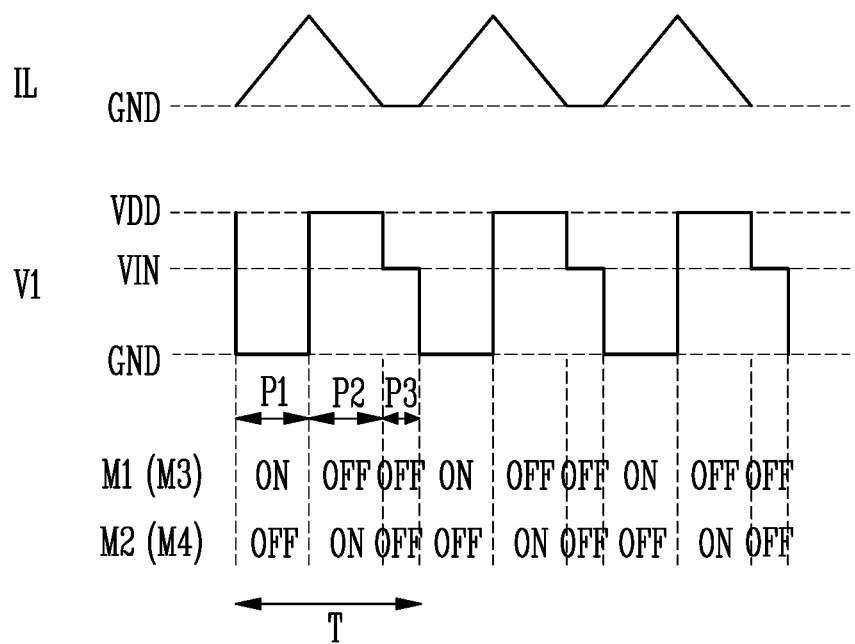
FIG. 7 is a timing diagram of another exemplary embodiment of signals of the first voltage generator of FIG. 4 performing a DCM driving method.
Figure 8:
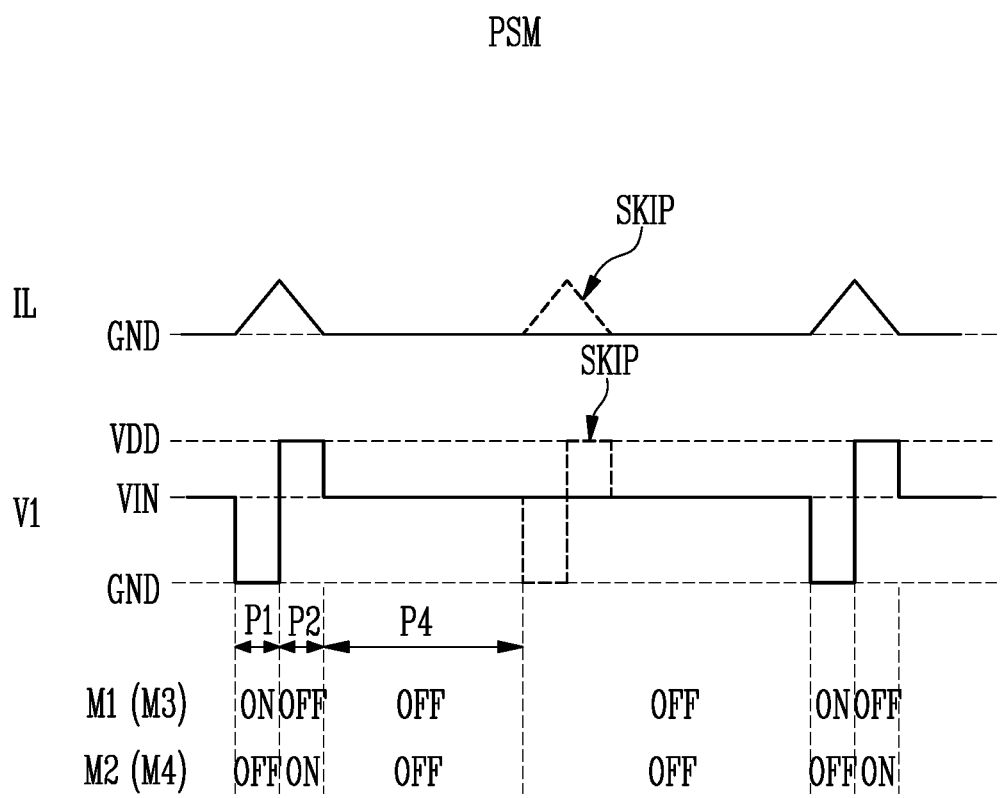
FIG. 8 is a timing diagram of still another exemplary embodiment of signals of the first voltage generator of FIG. 4 performing a PSM driving method.

FIG. 6 is a timing diagram of an exemplary embodiment of signals of the first voltage generator of FIG. 4 performing a CCM driving method. FIG. 7 is a timing diagram of another exemplary embodiment of signals of the first voltage generator of FIG. 4 performing a DCM driving method. FIG. 8 is a timing diagram of still another exemplary embodiment of signals of the first voltage generator of FIG. 4 performing a PSM driving method.

Referring to FIGS. 4, 6, 7, and 8, the first voltage generator 351 may operate by using the CCM driving method in the first mode, and operate by using the DCM driving method in the second mode. The second voltage generator 352 may operate by using one selected among the CCM, DCM, and PSM driving methods in the first mode, and operate by using the PSM driving method in the second mode. A driving method of the second voltage generator 352 (and the third voltage generator 353) in each mode is substantially identical or similar to that of the first voltage generator 351 in each mode, and therefore, the driving method of the first voltage generator 351 will be mainly described below.

In the CCM driving method, a first inductor current IL may be generated by alternately turning on the first and second transistors M1 and M2. As shown in FIG. 6, the first and second transistors M1 and M2 may be repeatedly turned on/off in a predetermined switching period T. The switching period T may be determined by the switching signal S_SW described with reference to FIGS. 4 and 5. The turn-on state of the first transistor M1 and the turn-on state of the second transistor M2 in the switching period T may not overlap with each other.

When the first transistor M1 is turned on in a first period P1, the first node voltage V1 of the first node N1 may have a ground level, and the magnitude of the first inductor current IL may be increased by a difference between a voltage of the power input terminal IN_P and the first node voltage V1 of the first node N1.

When the first transistor M1 is turned off and the second transistor M2 is turned on in a second period P2, the first node voltage V1 of the first node N1 may be increased to have a voltage level of the first power voltage VDD, and the magnitude of the first inductor current IL may be decreased by the difference between the voltage of the power input terminal IN_P and the first node voltage V1 of the first node N1. A width of the second period P2 may be equal to that of the first period P1.

The switching period T may be repeated, and the magnitude of the first inductor current IL may be continuously changed. In the CCM driving method, an output ripple is minimized, and thus high output stability can be obtained.

As shown in FIG. 7, the DCM driving method may include a third period P3 (or first discontinuous period) in which the first and second transistors M1 and M2 are simultaneously turned off in one switching period T. A width of the third period P3 may be smaller than that of the first period P1 and/or that of the second period P2.

In the third period P3, the first node voltage V1 of the first node N1 may have the voltage level of the input power voltage VIN. Since one end of the first inductor L1 is opened, the first inductor current IL may maintain the ground level, and the first inductor current IL may not be changed during the third period P3.

An amplitude of the first inductor current IL may be smaller than that in the CCM driving method. For example, a peak value of the first inductor current IL in the DCM driving method may be smaller than that of the first inductor current IL in the CCM driving method. This is because the first period P1 is relatively decreased while the third period P3 is inserted into the same switching period T. Similarly, the second period P2 may be relatively decreased.

As shown in FIG. 8, the PSM driving method may include a fourth period P4 (or second discontinuous period) in which the first and second transistors M1 and M2 are simultaneously turned off in one switching period T. A width of the fourth period P4 may be larger than that of the third period P3. The width of the fourth period P4 may be larger than a total width of the first period P1 and the second period P2.

In an exemplary embodiment, in the PSM driving method, a partial switching period may be skipped. A switching period of the first and second transistors M1 and M2 may be skipped, and the first inductor current IL may not flow during the skipped switching period. Accordingly, a magnitude of the first inductor current IL may be smaller than that in the second driving method.

In the PSM driving method, with respect to the case that the switching operations of the first transistor M1 and the second transistor M2 are operated in each period in other driving methods, a switching operation of the first and second transistors M1 and M2 is skipped in a predetermined period, and hence a total switching number (turn-on number) and/or a total switching time can be decreased. Thus, power loss caused by switching of the first and second transistors M1 and M2 can be improved.

Figures 10, 11:
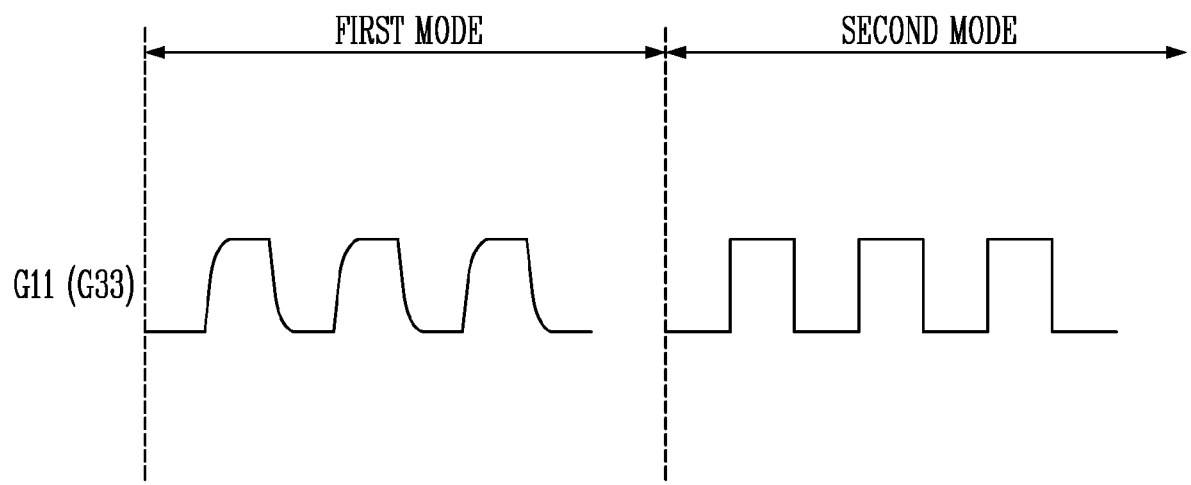
FIG. 10 is a diagram illustrating an exemplary embodiment of switching operations of the first voltage generator of FIG. 4.
FIG. 11 is a timing diagram of an exemplary embodiment of one of control signals used in the first voltage generator of FIG. 4.

FIG. 9 is a diagram illustrating an exemplary embodiment of operations of the power supply of FIG. 3 for each mode. FIG. 10 is a diagram illustrating an exemplary embodiment of switching operations of the first voltage generator of FIG. 4. FIG. 11 is a timing diagram of an exemplary embodiment of one of control signals used in the first voltage generator of FIG. 4.

Referring to FIGS. 1, 3, and 9, the power supply 150 may operate in the first mode or the second mode, based on the load of the display unit 110. For example, when a total current amount flowing through the pixels PXL in the display unit 110 is larger than or equal to a first reference current amount (or first reference current value), the power supply 150 may operate in the first mode (e.g., normal load mode, or heavy load mode). When the total current amount is smaller than the first reference current amount, the power supply 150 may operate in the second mode (or light load mode). For example, when the luminance of the display unit 110 is 100 nits (or when the luminance of the display unit 110 is equal to a luminance value at a boundary between a middle luminance and a low luminance), the first reference current amount may be equal to an amount of current flowing through the display unit 110.

In the first mode and the second mode, a driving method of the power supply 150, a size SIZE (or channel capacitance) of internal transistors TR, a switching frequency SW FREQ, and a slew rate SLEW RATE (i.e., a transition time of switching control signals for the internal transistors TR) may be differently set.

First, an operation of the power supply 150 in the first mode will be described.

Firstly, the power supply 150 may generate the first power voltage VDD by allowing the first voltage generator 351 to operate by using the CCM driving method.

Also, the power supply 150 may respectively generate the second power voltage VSS and the third power voltage AVDD by allowing the second voltage generator 352 and the third voltage generator 353 to operate by using one selected from the CCM driving method, the DCM driving method, and the PSM driving method. In an exemplary embodiment, the third voltage generator 353 is implemented as a boost converter, like the first voltage generator 351. In another exemplary embodiment, the third voltage generator 353 may operate by using a driving method similar to that of the second voltage generator 352. Since the first power voltage VDD generated by the first voltage generator 351 has direct influence on the driving current ID (see FIG. 2), the driving method of the first voltage generator 351 may be set differently from those of the second voltage generator 352 and the third voltage generator 353, and the driving method of the second voltage generator 352 and the driving method of the third voltage generator 353 may be set similarly to each other.

An example will be described with reference to FIG. 3. The functional circuit 320 may select one driving method among the CCM driving method, the DCM driving method, and the PSM driving method, based on a sensing signal (i.e., a total current amount) in the first mode, and generate a mode control signal including a first setting value (or code) corresponding to the selected driving method. The driving control circuit 360 may allow the second voltage generator 352 and the third voltage generator 353 performing by using the selected driving method.

Secondly, the power supply 150 may adjust the size SIZE (or channel capacitance) of the internal transistors TR to be largest (e.g., 100%). As described with reference to FIGS. 4 and 5, the power supply 150 may switch all of the transistors M1, M2, M3, and M4 and the power saving transistors PSM1, PSM2, PSM3, and PSM4. However, exemplary embodiments are not limited thereto. In some exemplary embodiments, when the load of the display unit 110 is relatively small, the power supply 150 may switch the power saving transistors PSM1, PSM2, PSM3, and PSM4, and maintain the transistors M1, M2, M3, and M4 to be in the turn-off state.

Thirdly, the power supply 150 may set the switching frequency SW FREQ to be within a reference frequency range. The highest frequency of the reference frequency range may be about 1.5 MHz, and the lowest frequency of the reference frequency range may be 500 KHz.

An example will be described with reference to FIG. 3. The functional circuit 320 may determine a switching frequency SW FREQ or determine a frequency division value of the reference clock signal CLK_REF, based on the sensing signal (i.e., the total current amount) in the first mode, and generate the mode control signal including a third setting value (or code) corresponding to the determined switching frequency SW FREQ or the determined frequency division value. For example, the frequency division value may be increased as the total current amount is decreased. The frequency generation circuit 330 may generate a switching signal (or switching clock signal) having the determined switching frequency SW FREQ by performing frequency division on the reference clock signal CLK_REF according to the third setting value.

Fourthly, the power supply 150 may set the slew rate SLEW to be within a reference slew rate range. For example, the reference slew rate range may be larger than 1 ns and be smaller than or equal to 10 ns. The reference slew rate range may include 1 ns, 3 ns, 5 ns, 10 ns, etc.

An example will be described with reference to FIG. 3. The functional circuit 320 may determine a slew rate SLEW, based on the sensing signal (i.e., the total current amount) in the first mode, and generate the mode control signal including a fourth setting value (or code) corresponding to the determined slew rate SLEW. For example, a transition time according to the slew rate SLEW may be decreased as the total current amount is decreased. The driving control circuit 360 may control the size of an output terminal (e.g., the size of an output buffer) of each of the first switching controller 351a and the second switching controller 352a to be changed correspondingly to the determined slew rate SLEW. For example, the size of the output buffer may be increased as the transition time according to the slew rate SLEW is set to be decreased.

In the first mode, the power supply 150 may control all the circuits (e.g., the voltage generation circuit 350) to operate (ALL FUNCTION ON). An example will be described with reference to FIG. 3. The functional circuit 320 may generate the mode control signal including a fifth setting value representing on/off of each of the circuits in the power supply 150. Circuits which directly/indirectly receive the mode control signal may operate based on the fifth setting value.

Hereinafter, an operation of the power supply 150 in the second mode will be described.

Firstly, the power supply 150 may generate the first power voltage VDD by allowing the first voltage generator 351 to operate by using the DCM driving method. Also, the power supply 150 may generate the second power voltage VSS and the third power voltage AVDD by allowing the second voltage generator 352 and the third voltage generator 353 to operate by using the PSM driving method.

Secondly, the power supply 150 may adjust the size of the internal transistors TR to be smallest (e.g., 17%). An example will be described with reference to FIG. 10. The power supply 150 may switch all of the first and second transistors M1 and M2 and the first and second power saving transistors PSM1 and PSM2 of the first voltage generator 351 in the first mode, or switch the first and second power saving transistors PSM1 and PSM2 of the first voltage generator 351 while maintaining the first and second transistors M1 and M2 of the first voltage generator 351 to be in the turn-off state in the second mode. Similarly, the power supply 150 may switch all of the third and fourth transistors M3 and M4 and the third and fourth power saving transistors PSM3 and PSM4 of the second voltage generator 352 in the first mode, or switch only the third and fourth power saving transistors PSM3 and PSM4 of the second voltage generator 352 in the second mode.

Thirdly, the power supply 150 may set the switching frequency SW FREQ to have a lowest frequency. For example, the lowest frequency may be 500 KHz.

An example will be described with reference to FIG. 3. The first functional block SFD1 may select a largest frequency division value (e.g., 8-frequency division) among a plurality of frequency division values in the first mode. The frequency generation circuit 330 may generate a switching signal (or switching clock signal) having the lowest frequency by performing frequency division on the reference clock signal CLK_REF by using the largest frequency division value. In another example, the second functional block SFD2 may determine an offset frequency. The frequency generation circuit 330 may generate a switching signal (or switching clock signal) having the lowest frequency by adding the offset frequency to the external clock signal T_HCLK. In this case, the switching signal may have the lowest frequency while avoiding an interference with the driving frequency of the scan driver 120. For example, the switching signal may include pulses having the lowest frequency such as a frequency the same as the external clock signal T_HCLK and having transition times that do not overlap transition times of the pulses of the external clock signal T_HCLK.

Fourthly, the power supply 150 may set a slew rate SLEW such that the transition time according to the slew rate SLEW becomes smallest. For example, the smallest transition time may be 0.9 ns, 0.8 ns, 0.7 ns, etc. An example will be described with reference to FIGS. 4 and 11. A transition time of the first power saving control signal G11 (or the third power saving control signal G33 (see FIG. 5)) in the first voltage generator 351 in the second mode may become smaller than that of the first power saving control signal G11 (or the third power saving control signal G33) in the first mode.

The driving control circuit 360 may set the size of the output terminal (e.g., the size of the output buffer) of each of the first switching controller 351a and the second switching controller 352a to be largest in the second mode.

In the second mode, the power supply 150 may turn off some of the circuits (e.g., the voltage generation circuit 350) (PARTIAL SHUTDOWN).

For example, the power supply 150 may partially turn off (or partially shut down) the third voltage generator 353 in the second mode.

As described with reference to FIG. 9, the power supply 150 operates in a plurality of modes (e.g., the first mode and the second mode), based on the load of the display unit 110. In the plurality of modes (e.g., the first mode and the second mode), a driving method of the power supply 150, a size SIZE (or channel capacitance) of internal transistors TR, a switching frequency SW FREQ, and a slew rate SLEW RATE (i.e., a transition time of switching control signals for the internal transistors TR) may be differently set.

In particular, in the second mode, the power supply 150 allows the first voltage generator 351 to operate by using the DCM driving method in which the off-duty of the internal transistors TR is relatively large, and allows the second voltage generator 352 and the third voltage generator 353 to operate by using the PSM driving method, so that power loss caused by switching can be reduced. In addition, in the second mode, the power supply 150 sets the size SIZE (or channel capacitance) of the internal transistors TR to be smallest, so that power loss caused by parasitic capacitance can be reduced. Further, in the second mode, the power supply 150 sets the frequency of a switching signal to be lowest by adding the offset frequency to the external clock signal T_HCLK, and sets the transition time of control signals for the internal transistors TR to be smallest, so that power loss caused by switching can be reduced.

Figure 12:
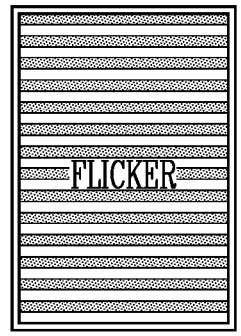
FIG. 12 is a diagram illustrating a relationship between a switching frequency of a switching signal generated in the frequency generation circuit of FIG. 3 and a reference clock signal.

FIG. 12 is a diagram illustrating a relationship between a switching frequency of a switching signal generated in the frequency generation circuit of FIG. 3 and a reference clock signal.

Referring to FIGS. 1, 3, and 12, the external clock signal T_HCLK accords with the driving frequency (or scan frequency) of the scan driver 120, and may be, for example, about 193 KHz. The period T of the external clock signal T_HCLK may be about 5.16 µs.

The reference frequency Main Freq. of the reference clock signal CLK_REF may be variously changed. For example, as shown in FIG. 12, the reference frequency may be changed at an interval of 0.03 MHz between 1.26 MHz and 1.71 MHz.

When the frequency generation circuit 330 generates a switching signal by performing 8-frequency division on the reference clock signal CLK_REF, the frequency (i.e. the 8-frequency-divided frequency ⅛ Freq.) of the switching signal may be changed at an interval of 3.75 KHz between about 0.1575 MHz (or about 157.5 KHz) and about 0.21375 MHz. The period of the switching signal may be changed at an interval of about 0.14 µs between about 6.349206 µs and about 4.678363 µs.

When the frequency of the switching signal is located between about 0.18 MHz and 0.2025 MHz, a flicker may occur in the display unit 110. For example, when the frequency of the switching signal is within a range of about −130 KHz to about +90 KHz or within a range of about −7% to about +5% with respect to the frequency of the external clock signal T_HCLK, an interference between the scan driver 120 and the power supply 150 may occur.

The frequency generation circuit 330 may generate a switching signal which can minimize power loss without any interference with the scan driver 120, by adding an offset frequency (e.g., ±50 KHz, ±100 KHz, ±150 KHz or ±200 KHz) to the external clock signal T_HCLK.

Figure 13:
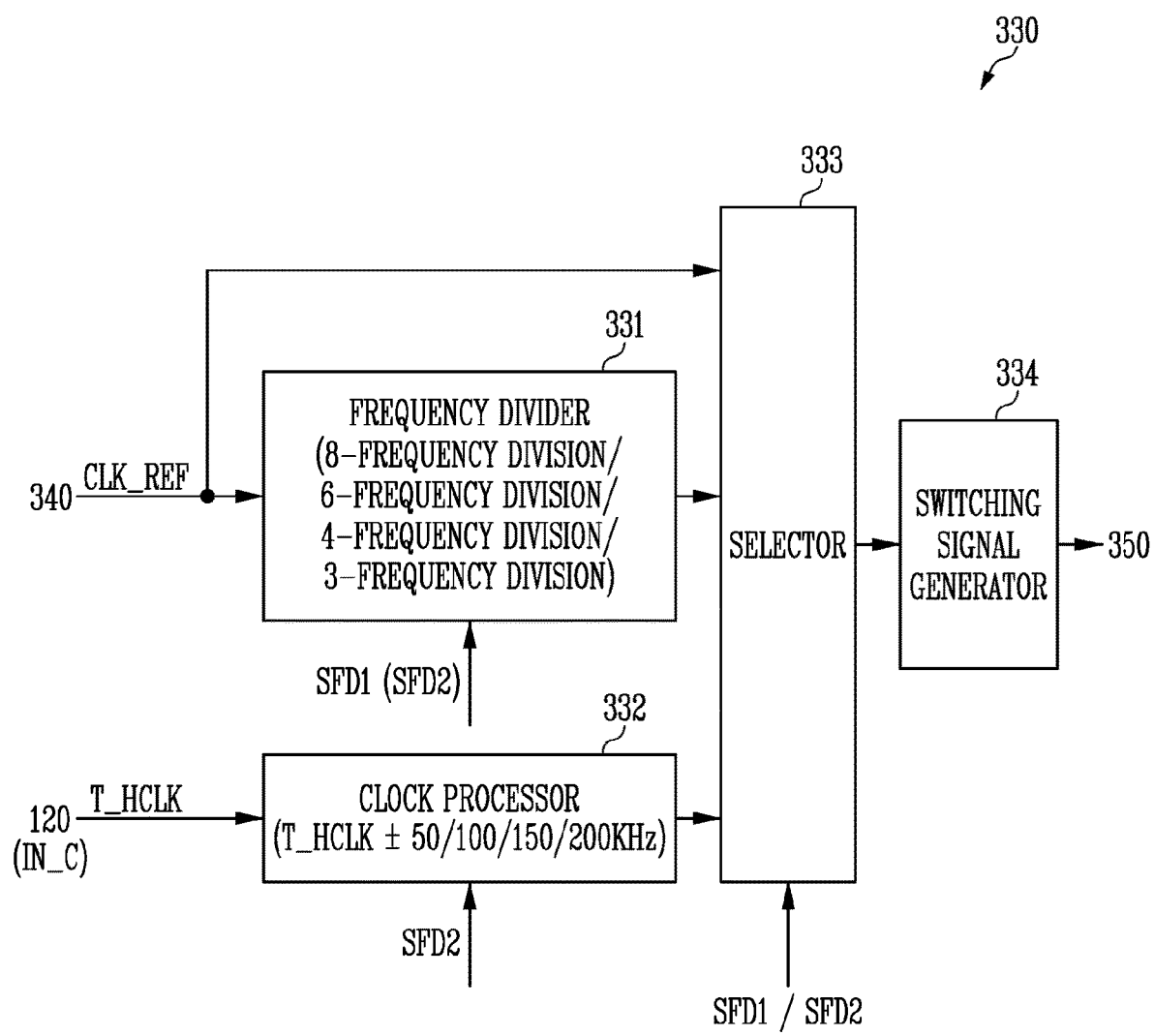
FIG. 13 is a block diagram of an exemplary embodiment of the frequency generation circuit of FIG. 3.

FIG. 13 is a block diagram of an exemplary embodiment of the frequency generation circuit of FIG. 3.

Referring to FIGS. 3 and 13, the frequency generation circuit 330 may include a frequency divider 331, a clock processor 332, a selector 333, and a switching signal generator 334.

The frequency divider 331 may generate a frequency-divided reference clock signal by performing frequency division on the reference clock signal CLK_REF in response to the first mode control signal provided from the first functional block SFD1.

As described above, the first mode control signal may include a setting value corresponding to a frequency division value, and the frequency divider 331 may perform frequency division on the reference clock signal by using the frequency division value. For example, the frequency division value may correspond to 8-frequency division, 4-frequency division, 3-frequency division, etc.

In some exemplary embodiments, the frequency divider 331 may perform frequency division on the reference clock signal CLK_REF in response to the second mode control signal (i.e., the second mode control signal including the frequency division value) provided from the second functional block SFD2.

The clock processor 332 may generate a compensated external clock signal by adding an offset frequency to the frequency of the external clock signal T_HCLK in response to the second mode control signal provided from the second functional block SFD2.

As described above, the second mode control signal may include the setting value corresponding to the offset frequency, and the clock processor 332 may generate the compensated external clock signal by selecting the offset frequency corresponding to the setting value among a plurality of offset frequencies. The offset frequencies may include ±50 KHz, ±100 KHz, ±150 KHz, and ±200 KHz. For example, the clock processor 332 may be configured as a delay circuit, and generate the compensated external clock signal by sequentially delaying pulses of the external clock signal T_HCLK by a time corresponding to the offset frequency.

The selector 333 may select and output one selected among the reference clock signal CLK_REF, the frequency-divided reference clock signal, and the compensated external clock signal in response to the first mode control signal provided from the first functional block SFD1 and the second mode control signal provided from the second functional block SFD2.

For example, when the first mode control signal includes a frequency-division value, the selector 333 may output the frequency-divided reference clock signal. For example, when the second mode control signal include the setting value corresponding to the offset frequency, the selector 333 may output the compensated external clock signal. For example, when the first mode control signal and the second mode control signal do not include a valid value associated with a switching frequency, the selector 333 may output the reference clock CLK_REF.

The switching signal generator 334 may output a switching signal, based on an output signal provided from the selector 333. For example, the switching signal generator 334 may output, as the switching signal, the output signal provided from the selector 333. For example, the switching signal generator 334 may be configured as a buffer. In some exemplary embodiments, the switching signal generator 334 may be omitted.

A frequency generation circuit 330 may separately senses a scan frequency (e.g., a phase or a change in phase of a scan signal) of the scan driver 120, and generate a switching signal having a switching frequency different from the sensed scan frequency, based on the scan frequency. However, the configuration of the frequency generation circuit 330 sensing the scan frequency may be complicated. On the other hand, the frequency generation circuit 330 uses a method of separately receiving the external clock signal T_HCLK and adding the offset frequency to the frequency of the external clock signal T_HCLK. Thus, the frequency generation circuit 330 can generate the switching signal while having a simple structure.

Figure 14:
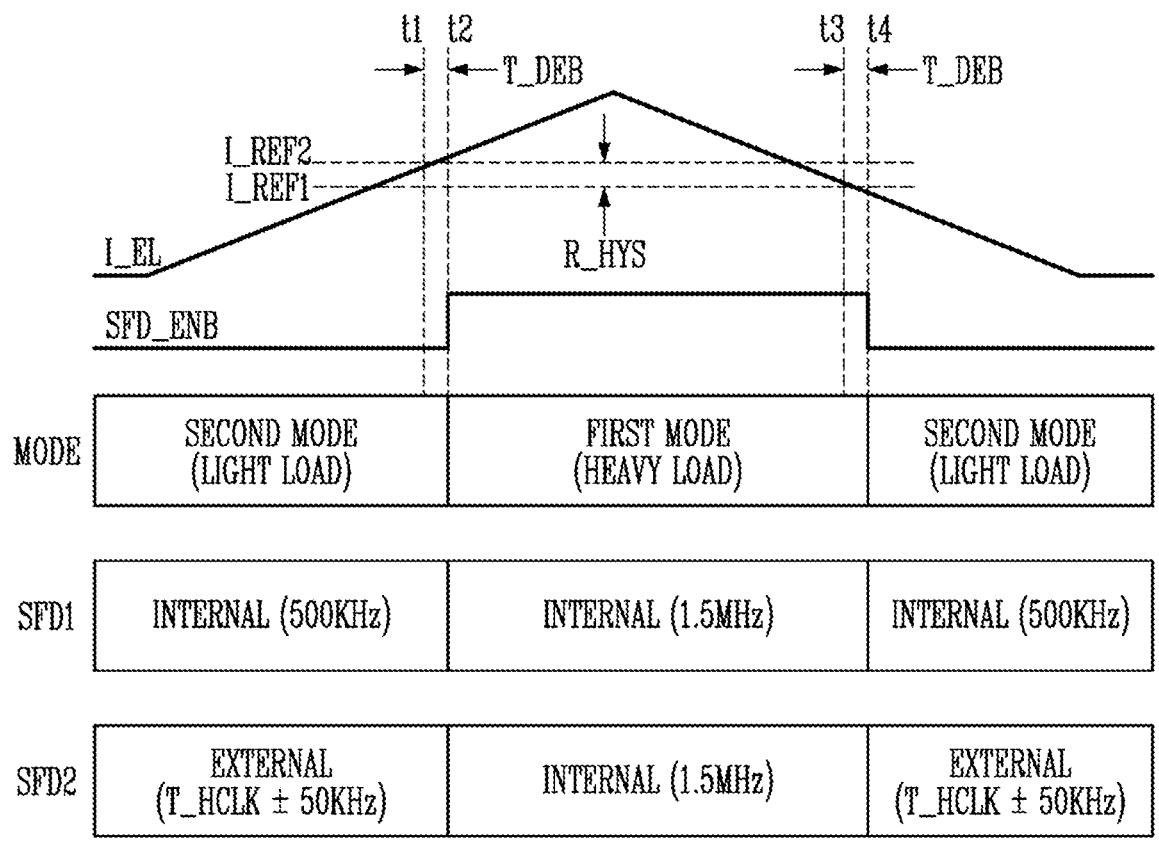
FIG. 14 is a diagram illustrating an exemplary embodiment of operations of the functional circuit and the frequency generation circuit of FIG. 3.

FIG. 14 is a diagram illustrating an exemplary embodiment of operations of the functional circuit and the frequency generation circuit of FIG. 3.

Referring to FIGS. 1, 3, and 14, the functional circuit 320 may determine a mode MODE, based on a total current amount I_EL of the display unit 110.

As shown in FIG. 14, at a first time t1, the total current amount I_EL may be larger than a second reference current value I_REF2. The functional circuit 320 may prepare for a mode change from the second mode (or light load mode) to the first mode (or heavy load mode).

In an exemplary embodiment, the functional circuit 320 may perform a mode change from the second mode to the first mode at a time after a debounce time T_DEB elapses from the first time t, i.e., at a second time t2. For example, the debounce time T_DEB may be set as about 100 μs, about 300 μs, about 500 μs, about 1000 μs, etc. When the debounce time T_DEB is set, frequent mode change can be prevented.

A mode signal SFD_ENB representing on/off of the first mode may be changed from a logic low level (i.e., an off state of the first mode) to a logic high level (i.e., an on state of the first mode) at the second time t2.

In the first mode, a mode control signal for the first mode may be provided to the frequency generation circuit 330 from the first functional block SFD1 or the second functional block SFD2, and the frequency generation circuit 330 may generate a switching signal by using an internal signal INTERNAL (i.e., the reference clock signal CLK_REF (see FIG. 3)). For example, in the first mode, the switching frequency of the switching signal may be about 1.5 MHz.

At a third time t3, the total current amount I_EL may become smaller than a first reference current value I_REF1. The functional circuit 320 may prepare for a mode change from the first mode to the second mode. The first reference current value I_REF1 may be smaller by a predetermined value than the second reference current value I_REF2. An interval between the first reference current value I_REF1 and the second reference current value I_REF2 may be defined as a hysteresis interval R_HYS, and any mode change may not be performed in the hysteresis interval R_HYS. When the hysteresis interval R_HYS is set, frequent mode change can be prevented.

Similarly to the second time t2, the functional circuit 320 may perform a mode change from the first mode to the second mode at a time after the debounce time T_DEB elapses from the third time t3, i.e., a fourth time t4. The mode signal SFD_ENB may be changed from the logic high level (i.e., the on state of the first mode) to the logic low level (i.e., the off state of the first mode) at the fourth time t4.

For example, in the second mode, when the first mode control signal associated with the second mode is provided to the frequency generation circuit 330 from the first functional block SFD1, the frequency generation circuit 330 may generate the switching signal by using the internal signal INTERNAL (i.e., the reference clock signal CLK_REF). For example, in the second mode, the switching frequency of the switching signal may be about 500 KHz.

In another example, in the second mode, when the second mode control signal associated with the second mode is provided to the frequency generation circuit 330 from the second functional block SFD2, the frequency generation circuit 330 may generate the switching signal by using an external signal EXTERNAL (i.e., the external clock signal T_HCLK (see FIG. 3)). For example, the frequency generation circuit 330 may generate a switching signal by adding an offset frequency to the frequency of the external clock signal T_HCLK. For example, the offset frequency may be about ±50 KHz.

As described with reference to FIG. 14, the functional circuit 320 can prevent the mode change between the first mode and the second mode from frequently occurring, by using the debounce time T_DEB and the hysteresis interval R_HYS.

FIGS. 15A, 15B, and 15C are diagrams of exemplary embodiments of register setting values for the power supply of FIG. 3.

Referring to FIGS. 1, 3, 15A, 15B, and 15C, the functional circuit 320 of the power supply 150 may store a register setting value.

The register setting value may include a setting value SFD_Transistion_Level for mode change, a setting value SFD_Hys_Level for hysteresis interval R_HYS, a setting value SFD_Decounce_time for debounce time T_DEB, a setting value SFD_Mode for functional block activation, a setting value SFD_Function for function changed according to mode control signal, a setting value SFD_Block for output block, a first setting value SFD1_Freq for switching frequency, and a second setting value SFD2_Freq for switching frequency.

The setting value SFD_Transistion_Level for mode change is a setting value for the load of the display unit 110, which becomes a reference for change from the first mode to the second mode. That is, the setting value SFD_Transistion_Level for mode change may define a value of the first reference current amount (or the first reference current value I_REF1 (see FIG. 14)) as a reference in which the second mode (e.g., a sequential frequency driving (SFD)) is on (or activated) or off (or inactivated).

Referring to a first table TABLE1 shown in FIG. 15B, the setting value SFD_Transition_Level for mode change may be expressed with 2 bits. For example, the setting value SFD_Transition_Level for mode change may be set to one of 20 mA, 30 mA, 40 mA, and 50 mA. However, this is merely illustrative, and the setting value SFD_Transition_Level for mode change may be expressed with 3 bits or more, which may be variously set.

For example, the setting value SFD_Transition_Level for mode change may be set by an external input in a manufacturing process of the display device 100. The setting value SFD_Transition_Level for mode change may be set in proportion to the maximum load of the display unit 110. In another example, when the mode change between the second mode and the first mode frequently occurs (e.g., when the number of times the mode conversion between the second mode and the first mode occurs for a specific time exceeds a predetermined number of times), the setting value SFD_Transition_Level for mode change may be updated to have a smaller value (e.g., the setting value may be changed from 11 to 10).

The setting value SFD_Hys_Level for hysteresis interval R_HYS is a setting value for the hysteresis interval R_HYS described with reference to FIG. 14. That is, the setting value SFD_Hys_Level for hysteresis interval R_HYS may define a hysteresis value with which the second mode (or an SFD operation) is maintained, according to the load of the display unit 110.

Referring to a second table TABLE2 shown in FIG. 15, the setting value SFD_Hys_Level for hysteresis interval R_HYS may be expressed with 2 bits. For example, the setting value SFD_Hys_Level for hysteresis interval R_HYS may be set to one of 5 mA, 10 mA, and 15 mA. However, this is merely illustrative, and the setting value SFD_Hys_Level for hysteresis interval R_HYS may be more variously set.

For example, the setting value SFD_Hys_Level for hysteresis interval R_HYS may be set by an external input in a manufacturing process of the display device 100. In another example, when the mode change between the second mode and the first mode frequently occurs (e.g., when the number of times the mode conversion between the second mode and the first mode occurs for a specific time exceeds a predetermined number of times), the setting value SFD_Hys_Level for hysteresis interval R_HYS may be updated to have a larger value (e.g., the setting value may be changed from 00 to 01).

The setting value SFD_Decounce_time for debounce time T_DEB is a setting value for the debounce time T_DEB described with reference to FIG. 14. That is, the setting value SFD_Decounce_time for debounce time T_DEB may defined a time from a time at which the second mode (or the SFD operation) is determined to a time until the second mode (or the SFD operation) is applied, according to the load of the display unit 110.

Referring to a third table TABLE3 shown in FIG. 15B, the setting value SFD_Decounce_time for debounce time T_DEB may be expressed with 2 bits. For example, the setting value SFD_Decounce_time for debounce time T_DEB may be set to one of 100 µs, 300 µs, 500 µs, and 1000 µs. However, this is merely illustrative, and the setting value SFD_Decounce_time for debounce time T_DEB may be more variously set.

For example, the setting value SFD_Decounce_time for debounce time T_DEB may be set by an external input in a manufacturing process of the display device 100. In another example, when the mode change between the second mode and the first mode frequently occurs (e.g., when the number of times the mode conversion between the second mode and the first mode occurs for a specific time exceeds a predetermined number of times), the setting value SFD_Decounce_time for debounce time T_DEB may be updated to have a larger value (e.g., the setting value may be changed from 00 to 01).

The setting value SFD_Mode for functional block activation may be a setting value for an activated functional block selected from the functional blocks SFD1 and SFD2 in the functional circuit 320.

Referring to a fourth table TABLE4 shown in FIG. 15B, the setting value SFD_Mode for functional block activation may be expressed with 2 bits. For example, the setting value SFD_Mode for functional block activation may include activation of the first functional block SFD1, activation of the second functional block SFD2, and functional block inactivation SFD OFF.

For example, the setting value SFD_Mode for functional block activation may be set by an external input in a manufacturing process of the display device 100. In another example, when the external clock signal T_HCLK is input to the power supply 150, the setting value SFD_Mode for functional block activation may be set as 01. When the external clock signal T_HCLK is not input to the power supply 150 or when the input of the external clock signal T_HCLK is suspended, the setting value SFD_Mode for functional block activation may be set as 00 or be updated.

The setting value SFD_Function for function changed according to mode control signal may be a setting value for whether functions of changing a switching frequency, a slew rate, a size of a transistor, a driving mode (i.e., a driving mode of the voltage generators 351, 352, and 353) is to be performed.

Referring to a fifth table TABLE5 shown in FIG. 15C, the setting value SFD_Function for function changed according to mode control signal may be expressed with 3 bits. For example, the setting value SFD_Function for function changed according to mode control signal may be set to one of selection of only a function of changing the frequency (Frequency only), selection of only a function of changing the slew rate (Slew rate only), selection of only a function of changing the size of the transistor (TR size only), selection of only a function of changing the driving mode (Driving Mode only), non-selection of only the function of changing the slew rate (Slew rate off) (i.e., selection of the functions of changing the frequency, the size of the transistor, and the driving mode), non-selection of only the function of changing the size of the transistor (TR size off), non-selection of only the function of changing the driving mode (Driving Mode off), and selection of all the functions (All on). However, this is merely illustrative, and the setting value SFD_Function for function changed according to mode control signal may be expressed with 4 bits or more, which may be more variously set.

For example, the setting value SFD_Function for function changed according to mode control signal may be included in the mode control signal generated by the functional circuit 320, and be provided to the frequency generation circuit 330 and the driving control circuit 360. For example, when the setting value SFD_Function for function changed according to mode control signal includes one of 000, 100, 101, 110, and 111, the frequency generation circuit 330 may change the switching frequency of the switching signal. In another example, when the setting value SFD_Function for function changed according to mode control signal includes 001, the driving control circuit 360 may change only the slew rate of the control signals for the transistors in the voltage generation circuit 350.

The setting value SFD_Block for output block is a selection value for an output block controlled according to the mode control signal (or in the SFD operation), and be defined as a selection value for at least one of the first, second, and third voltage generators 351, 352, and 353.

Referring to a sixth table TABLE6 shown in FIG. 15C, the setting value SFD_Block for output block may be expressed with 3 bits. For example, the setting value SFD_Block for output block may be set to one of selection of only the first voltage generator 351 (VO1 only), selection of only the second voltage generator 352 (VO2 only), selection of only the third voltage generator 353 (VO3 only), selection of only the first and second voltage generators 351 and 352 (VO1/VO2 only), selection of the second and third voltage generators 352 and 353 (VO2/VO3 only), and selection of all the voltage generators 351, 352, and 353 (All on).

For example, the setting value SFD_Block for output block may be included in the mode control signal generated by the functional circuit 320, and be provided to the driving control circuit 360. For example, when the setting value SFD_Block for output block includes 000, the driving control circuit 360 may apply the setting value SFD_Block for output block to only the first voltage generator 351.

The first setting value SFD1_Freq for switching frequency may be defined as information on a switching frequency provided from the first functional block SFD1.

Referring to a seventh table TABLE7 shown in FIG. 15C, the first setting value SFD1_Freq for switching frequency may be expressed with 2 bits. For example, the first setting value SFD1_Freq for switching frequency may be set to one of 1 MHz, 500 KHz, 300 KHz, and 250 KHz. This is merely illustrative, and the first setting value SFD1_Freq for switching frequency may be expressed with 3 bits or more, which may be more variously set.

For example, the first setting value SFD1_Freq for switching frequency may be included in the mode control signal output from the functional circuit 320, and be provided to the frequency generation circuit 330. For example, when the first setting value SFD1_Freq for switching frequency includes 11, the frequency generation circuit 330 may generate a switching signal having a switching frequency of 250 KHz by performing 6-frequency division on the reference clock signal CLK_REF (e.g., 1.5 MHz).

The second setting value SFD2_Freq for switching frequency may be defined as information on an offset frequency provided from the second functional block SFD2.

Referring to an eighth table TABLE8 shown in FIG. 15C, the second setting value SFD2_Freq for switching frequency may be expressed with 2 bits. For example, the second setting value SFD2_Freq for switching frequency may be set to one of ±50 KHz, ±100 KHz, ±150 KHz, and ±200 KHz. However, this is merely illustrative, and the second setting value SFD2_Freq for switching frequency may be expressed with 3 bits or more, which may be more variously set.

For example, the second setting value SFD2_Freq for switching frequency may be included in the mode control signal output from the functional circuit 320 (or the second mode control signal output from the second functional block SFD2), and be provided to the frequency generation circuit 330. For example, when the second setting value SFD2_Freq for switching frequency includes 00, the frequency generation circuit 330 may generate a switching signal having a switch frequency of, for example, 243 KHz by adding an offset frequency of ±50 KHz to the external clock signal T_HCLK (e.g., 193 KHz).

As described with reference to FIGS. 15A, 15B, and 15C, the register setting values are stored in the power supply 150, and may be set in the manufacturing process of the display device 100 or be included in the mode control signal of the functional circuit 320. Thus, the efficiency of the power supply 150 can be further improved through various combinations of the register setting values.

Figure 16:
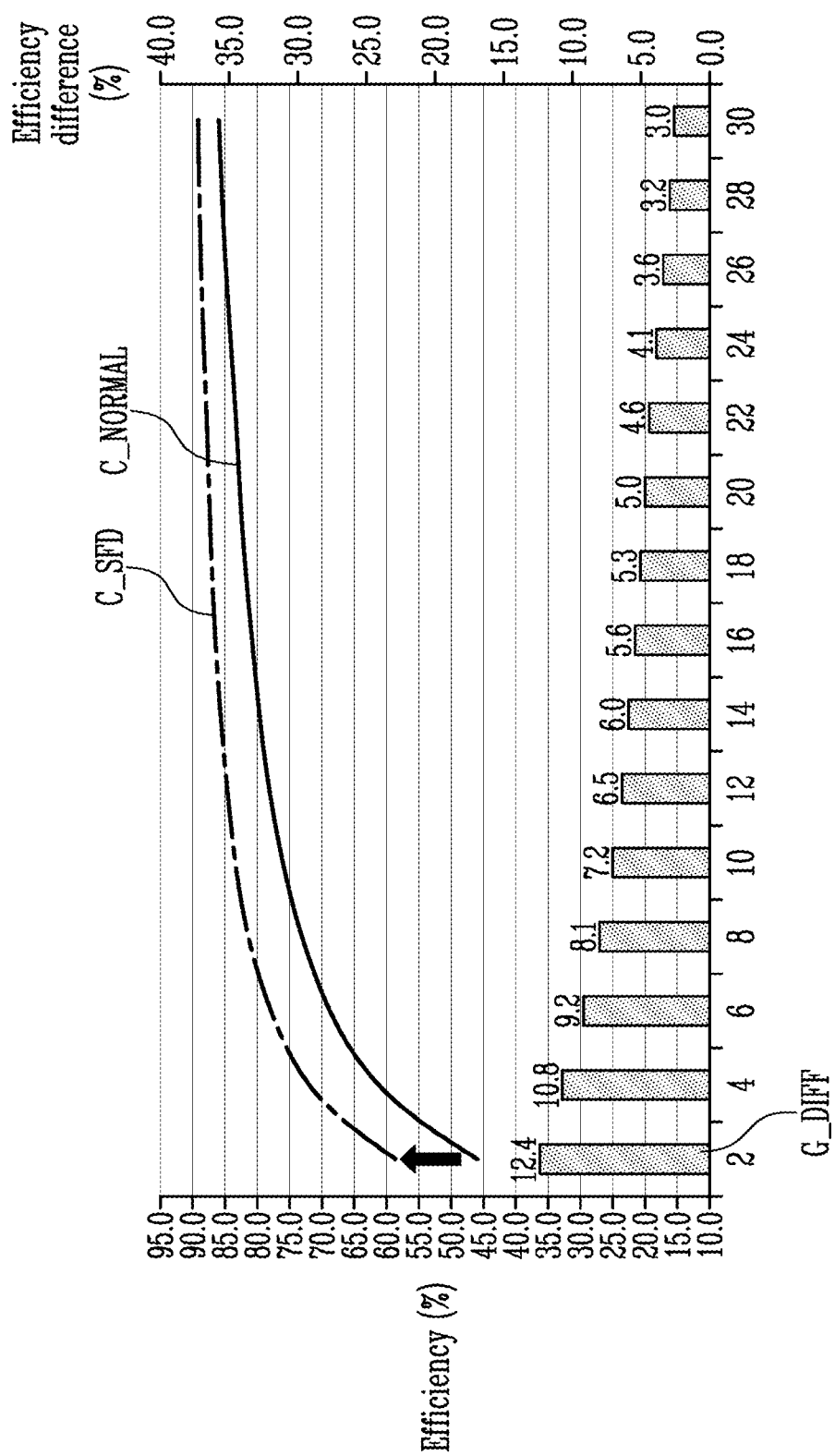
FIG. 16 is a diagram illustrating efficiency of the power supply of FIG. 3.

FIG. 16 is a diagram illustrating efficiency of the power supply of FIG. 3. In FIG. 16, the horizontal axis denotes a total current amount I_EL, and the vertical axis denotes current efficiency of a power supply in a unit of percentage.

Referring to FIGS. 3, 9, and 16, a first curve C NORMAL represents efficiency of the power supply according to the total current amount I_EL of a power supply in accordance with a comparative example, which operates in only the first mode. A second curve C_SFD represents efficiency of the power supply 150 according to the total current amount I_EL of the power supply 150, which performs a change between the first mode and the second mode. A difference graph G_DIFF may represent an efficiency difference between the efficiency of the power supply 150 and the efficiency of the power supply in accordance with the comparative example, according to the total current amounts I_EL.

As described above, as the total current amount I_EL is decreased, the efficiency of the power supply 150 may be lowered while the rate of power loss of the power supply 150 is increased. For example, according to the first curve C NORMAL, the efficiency of the power supply in accordance with the comparative example may be about 86% when the total current amount I_EL is 30 mA. The efficiency may be lowered as the total current amount I_EL is decreased. The efficiency may be lowered down to about 46% when the total current amount I_EL is 2 mA.

The power supply 150 changes at least one of a driving mode, a size of a transistor, a switching frequency, and a slew rate in the second mode, so that the efficiency of the power supply 150 can be represented higher than that of the power supply in accordance with the comparative example.

According to the second curve C_SFD, the power supply 150 may operate in the second mode when the total current amount I_EL is 30 mA, and the efficiency of the power supply 150 may be about 89%. That is, the efficiency of the power supply 150 may be higher by about 3.0% than that of the power supply in accordance with the comparative example. While the efficiency of the power supply 150 is decreased as the total current amount I_EL is decreased, the efficiency difference between the efficiency of the power supply 150 and the efficiency of the power supply in accordance with the comparative example may be increased as the total current amount I_EL is decreased. When the total current amount I_EL is 2 mA, the efficiency of the power supply 150 is lowered down to about 58.4%, but may be higher by about 12.4% than that of the power supply in accordance with the comparative example.

That is, the power supply 150 changes at least one of the driving mode, the size of the transistor, the switching frequency, and the slew rate in the second mode. In particular, the power supply 150 sets a switching frequency and changes the slew rate by using the external clock signal T_HCLK, so that the efficiency of the power supply 150 can be further improved than that of the power supply in accordance with the comparative example.

Further, the power supply 150 sets an optimum switching frequency by using the external clock signal T_HCLK, so that power loss can be minimized without any interference between the power supply 150 and the scan driver 120, i.e., while maintaining display quality.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
    a display panel including scan lines, a first power line, a second power line, and pixels connected to the scan lines and the first and second power lines;
    a gate driver to sequentially provide scan signals to the scan lines based on a clock signal; and
    a power supply including transistors to convert an input power voltage into a first power voltage through a switching operation of the transistors and to supply the first power voltage to the first power line through a first output terminal,
    wherein, in response to an amount of current flowing through the pixels being less than a first reference current amount, the power supply is configured to change one or more of an off-duty of at least one of the transistors, a channel capacitance of at least one of the transistors, a switching frequency of at least one of the transistors, and a slew rate of at least one of control signals for the transistors.

2. The display device of claim 1, wherein the power supply includes:
    a frequency generation circuit to generate a switching signal having a first switching frequency in a first mode, and generate the switching signal having a second switching frequency in a second mode;
    a first voltage generation circuit including the transistors to generate the first power voltage in response to the switching signal;
    a sensing circuit to sense the amount of the current by measuring current at the first output terminal; and
    a functional circuit to generate a mode control signal to control the frequency generation circuit to operate in the first mode or the second mode by comparing the amount of the current with the first reference current amount, and
    wherein the second switching frequency is lower than the first switching frequency, and is set to avoid a frequency of the clock signal.

3. The display device of claim 2, wherein the power supply further includes an oscillation circuit to generate a reference clock signal having a reference frequency, and
    wherein the frequency generation circuit is configured to generate the switching signal by performing frequency division on the reference clock signal in the first mode.

4. The display device of claim 2, wherein the power supply is configured to receive the clock signal through a clock signal input terminal, and
    wherein the frequency generation circuit is configured to shift the clock signal by an offset frequency to generate the switching signal in the second mode.

5. The display device of claim 4, wherein the power supply further includes an oscillation circuit to generate a reference clock signal having a reference frequency, and
    wherein the frequency generation circuit is configured to generate the switching signal based on the reference clock signal in the first mode.

6. The display device of claim 5, wherein the frequency generation circuit includes:
    a frequency divider to generate a frequency-divided reference clock signal by performing frequency division on the reference clock signal in response to a first mode control signal generated by the functional circuit;
    a clock processor to generate a compensated clock signal by shifting the clock signal by the offset frequency in response to a second mode control signal generated by the functional circuit; and
    a selector to output, as the switching signal, one selected among the reference clock signal, the frequency-divided reference clock signal, and the compensated clock signal in response to the first mode control signal or the second mode control signal.

7. The display device of claim 6, wherein the clock processor is configured to generate the compensated clock signal by delaying pulses of the clock signal.

8. The display device of claim 2, wherein the functional circuit is configured to:
    perform a mode change from the second mode to the first mode when the amount of current becomes smaller than the first reference current amount; and
    perform a mode change from the first mode to the second mode when the amount of current becomes larger than a second reference current amount, and
    wherein the second reference current amount is larger than the first reference current amount.

9. The display device of claim 8, wherein the functional circuit is configured to perform the mode change from the first mode to the second mode after a predetermined debounce time elapses from a time at which the amount of current becomes smaller than the first reference current amount.

10. The display device of claim 2, wherein the power supply further includes a driving control circuit to generate a driving control signal in response to the mode control signal, and
    wherein the first voltage generation circuit includes:
    a first switching controller to generate a first control signal and a second control signal, each of which has a frequency corresponding to the frequency of the switching signal, and change a waveform of each of the first control signal and the second control signal in response to the driving control signal;
    an inductor connected between a power input terminal to which the input power voltage is applied and a first node;
    a first transistor connected between the first node and a reference power source, the first transistor being operated in response to the first control signal; and
    a second transistor connected between the first node and the first output terminal, the second transistor being operated in response to the second control signal.

11. The display device of claim 10, wherein the slew rate of the control signals is defined as a transition time between a turn-on level and a turn-off level of the control signals, and
    wherein the first switching controller is configured to decrease the transition time of the first control signal in the second mode to be less than the transition time of the first control signal in the first mode in response to the driving control signal.

12. The display device of claim 10, wherein the first voltage generation circuit is configured to:
   operate in a first driving mode for alternately turning on the first and second transistors in the first mode; and
   operate in a second driving mode in the second mode, and
   wherein, in the second driving mode, the first voltage generation circuit is configured to alternately turn on the first and second transistors in a first period, and turn off the first and second transistors in a second period.

13. The display device of claim 12, wherein the first voltage generation circuit further includes:
   a first auxiliary transistor connected in parallel to the first transistor; and
   a second auxiliary transistor connected in parallel to the second transistor, and
   wherein the first voltage generation circuit is configured to:
   alternately turn on the first and second transistors in the first mode; and
   turn off the first and second transistors and alternately turn on the first and second auxiliary transistors in the second mode.

14. The display device of claim 12, wherein the power supply further includes a second voltage generation circuit to generate a second power voltage in response to the switching signal, and supply the second power voltage to the second power line through a second output terminal.

15. The display device of claim 14, wherein the second voltage generation circuit includes:
   a second switching controller to generate a third control signal and a fourth control signal, each of which has a frequency corresponding to the frequency of the switching signal, and change a waveform of each of the third control signal and the fourth control signal in response to the driving control signal;
   a third transistor connected between a power input terminal to which the input power voltage is applied and a second node, the third transistor being operated in response to the third control signal;
   an inductor connected between the second node and a reference power source; and
   a fourth transistor connected between the second node and the second output terminal, the fourth transistor being operated in response to the fourth control signal.

16. The display device of claim 15, wherein the second voltage generation circuit is configured to operate in a third driving mode in the second mode in response to the driving control signal,
   wherein, in the third driving mode, the second voltage generation circuit is configured to alternately turn on the third and fourth transistors in a third period, and turn off the third and fourth transistors in a fourth period, and
   wherein the fourth period is greater than or equal to the third period.

17. The display device of claim 16, wherein the second voltage generation circuit is configured to operate in one selected among the first driving mode, the second driving mode, and third driving mode in the first mode in response to the driving control signal.

18. The display device of claim 14, further comprising a data driver to provide data signals to the pixels through data lines,
   wherein the power supply further includes a third voltage generation circuit to generate a third power voltage in response to the switching signal, and supply the third power voltage to the data driver through a third output terminal.

19. A power supply for outputting a power voltage through an output terminal, the power supply comprising:
   an input terminal to receive a clock signal;
   a sensing circuit to measure an amount of current at the output terminal;
   a functional circuit to generate a first mode control signal or a second mode control signal by comparing the amount of current with a reference current amount;
   an oscillation circuit to generate a reference clock signal having a reference frequency;
   a frequency generation circuit to generate a switching signal by performing frequency division on the reference clock signal in response to the first mode control signal, or generate the switching signal by shifting the clock signal by an offset frequency in response to the second mode control signal; and
   a voltage generation circuit including transistors to convert an input power voltage into the power voltage by switching the transistors in response to the switching signal,
   wherein a switching frequency of the switching signal is set to avoid a frequency of the clock signal.

20. The power supply of claim 19, further comprising a driving control circuit to generate a driving control signal in response to the first mode control signal or the second mode control signal,
   wherein the voltage generation circuit includes:
   a switching controller to generate a first control signal and a second control signal, each of which has a frequency corresponding to the frequency of the switching signal, and change a waveform of each of the first control signal and the second control signal in response to the driving control signal;
   an inductor connected between a power input terminal to which an input power voltage is applied and a first node;
   a first transistor connected between the first node and a reference power source, the first transistor being operated in response to the first control signal; and
   a second transistor connected between the first node and the output terminal, the second transistor being operated in response to the second control signal, and
   wherein the switching controller is configured to change a slew rate of the first control signal in response to the driving control signal corresponding to the second mode control signal.

* * * * *